United States Patent [19]
Barber

[11] 3,774,100

[45] Nov. 20, 1973

[54] TURRET INDEXING MOTOR CONTROL SYSTEM

[75] Inventor: Joseph J. Barber, Williamsville, N.Y.

[73] Assignee: Houdaille Industries, Inc., Buffalo, N.Y.

[22] Filed: June 1, 1971

[21] Appl. No.: 148,741

Related U.S. Application Data

[63] Continuation-in-part of Ser. No. 77,139, Oct. 1, 1970, Pat. No. 3,675,107.

[52] U.S. Cl. ............... 318/601, 318/603, 29/26 A, 29/568
[51] Int. Cl. ......................................... G05b 19/28
[58] Field of Search .................... 318/600, 601, 602, 318/603; 29/26 A, 568

[56] References Cited
UNITED STATES PATENTS

| | | | |
|---|---|---|---|
| 3,675,107 | 7/1972 | Barber | 318/603 |
| 3,569,815 | 3/1971 | McNaughton | 318/601 |
| 3,333,089 | 7/1967 | Saylor et al. | 318/601 X |
| 3,448,360 | 6/1969 | Pohl | 318/601 |
| 3,465,217 | 9/1969 | Kress | 318/601 |
| 3,573,589 | 4/1971 | Berry | 318/601 |

*Primary Examiner*—T. E. Lynch
*Attorney*—Hill, Sherman, Meroni, Gross & Simpson

[57] ABSTRACT

An indexing control system for a rotatable turret punching press where tool stations have different indexing distances therebetween and a read only memory stores the number of indexing pulses required to index between each pair of adjacent stations. A position register functions to provide a present position value at the beginning of each indexing operation and also serves to control readout from the memory of the number of indexing pulses required to execute a new command. The total number of indexing pulses required for indexing movement in a given direction may be accumulated and then used to control the actual indexing movement of the turret (and also the direction of indexing movement, if desired).

4 Claims, 31 Drawing Figures

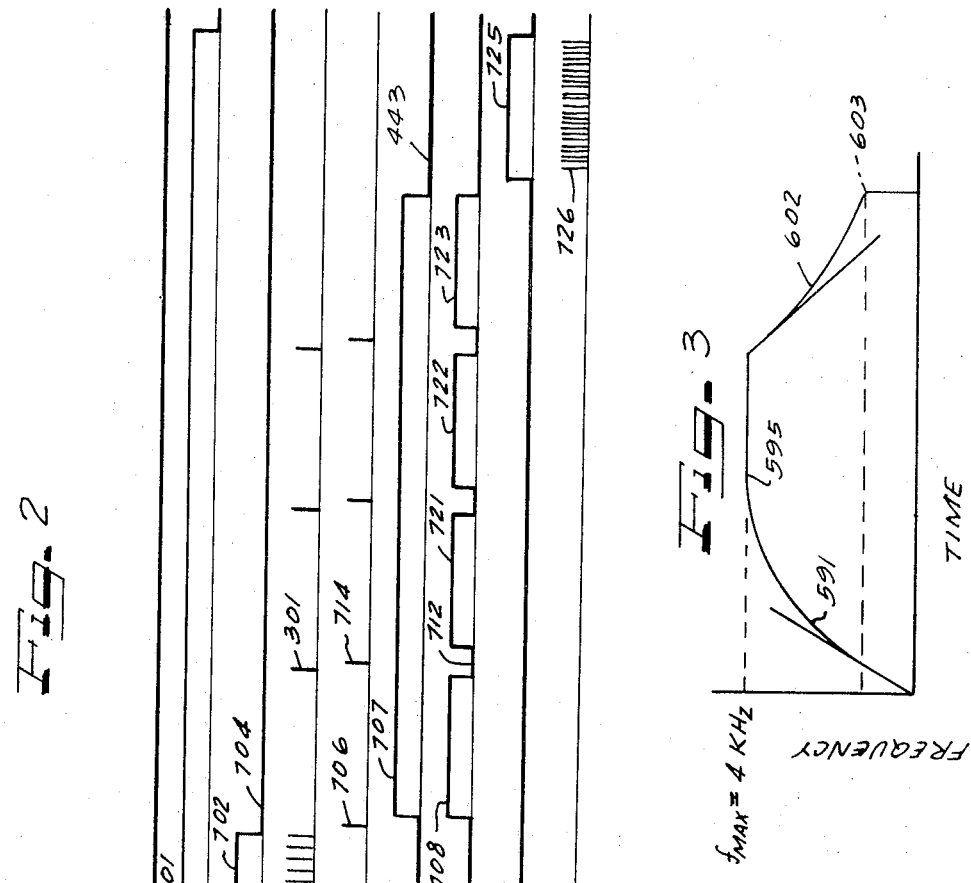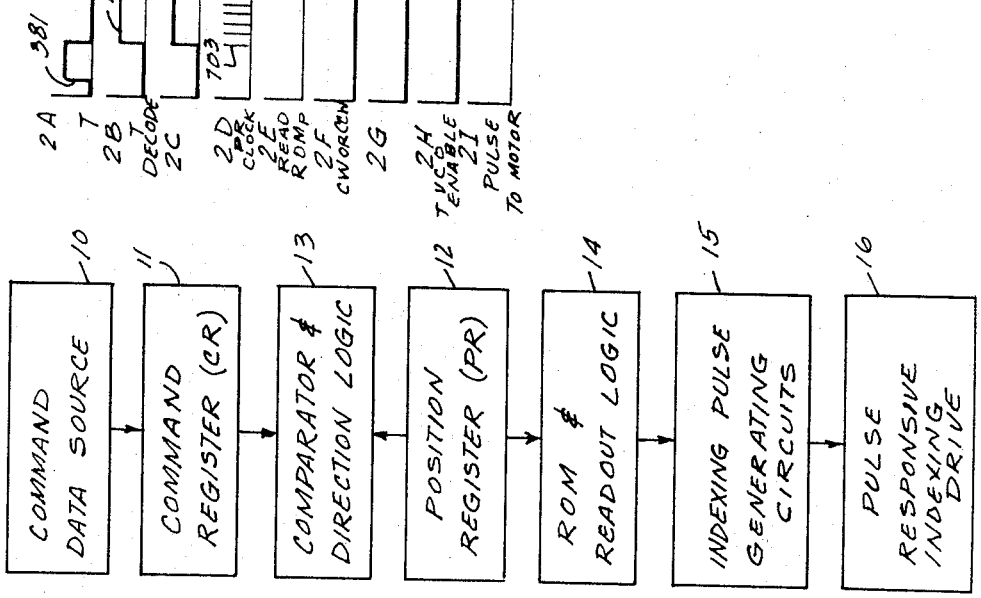

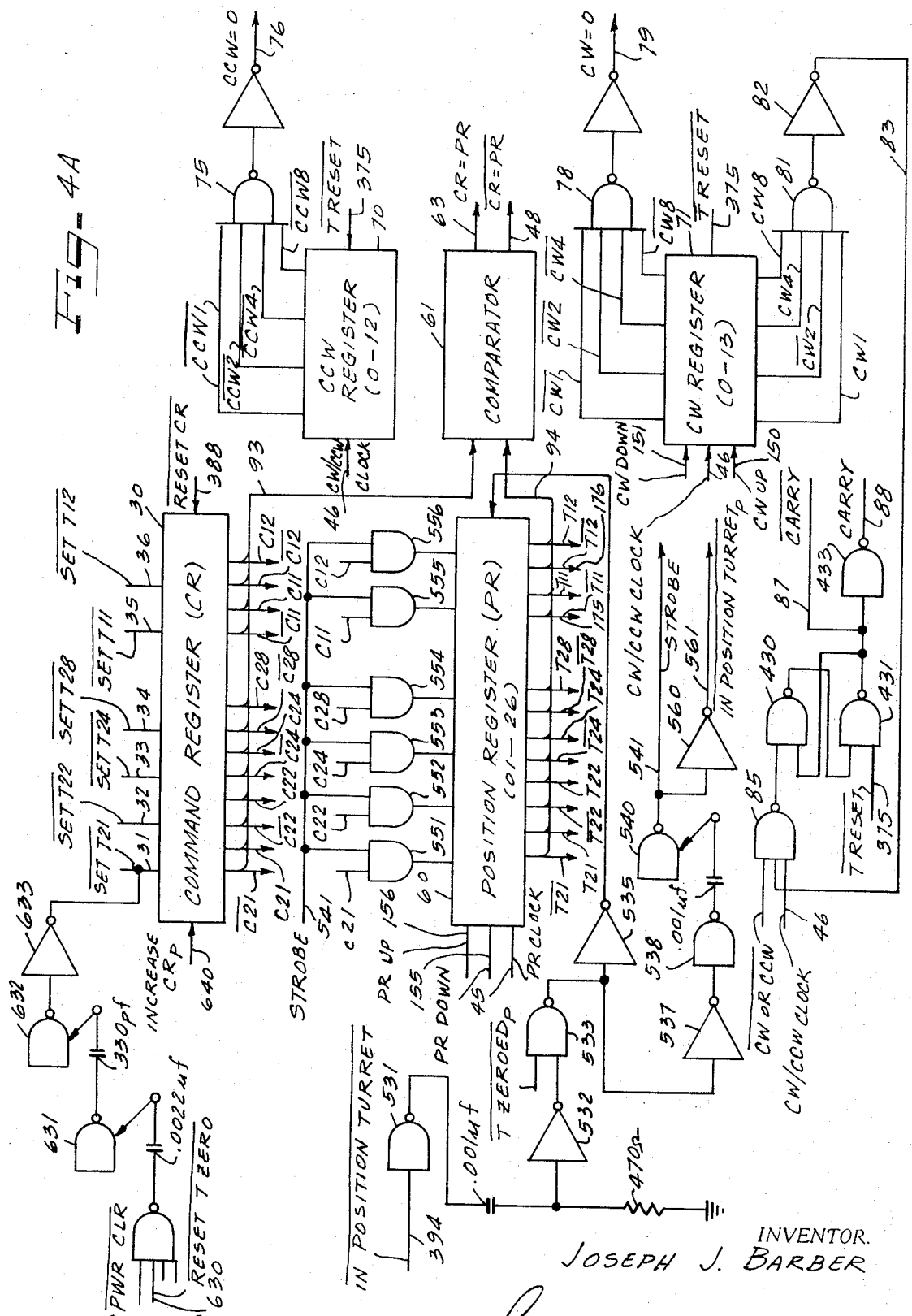

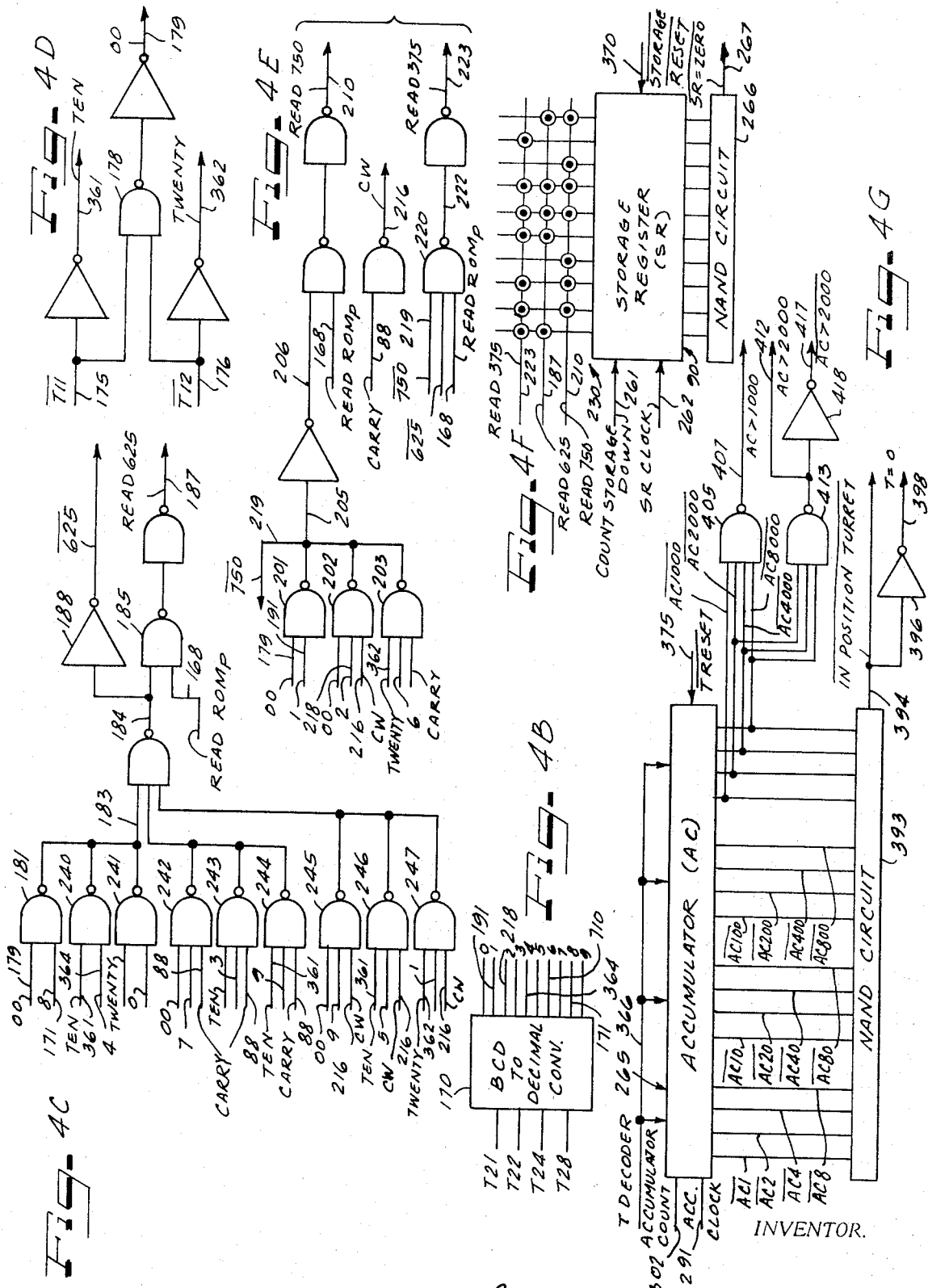

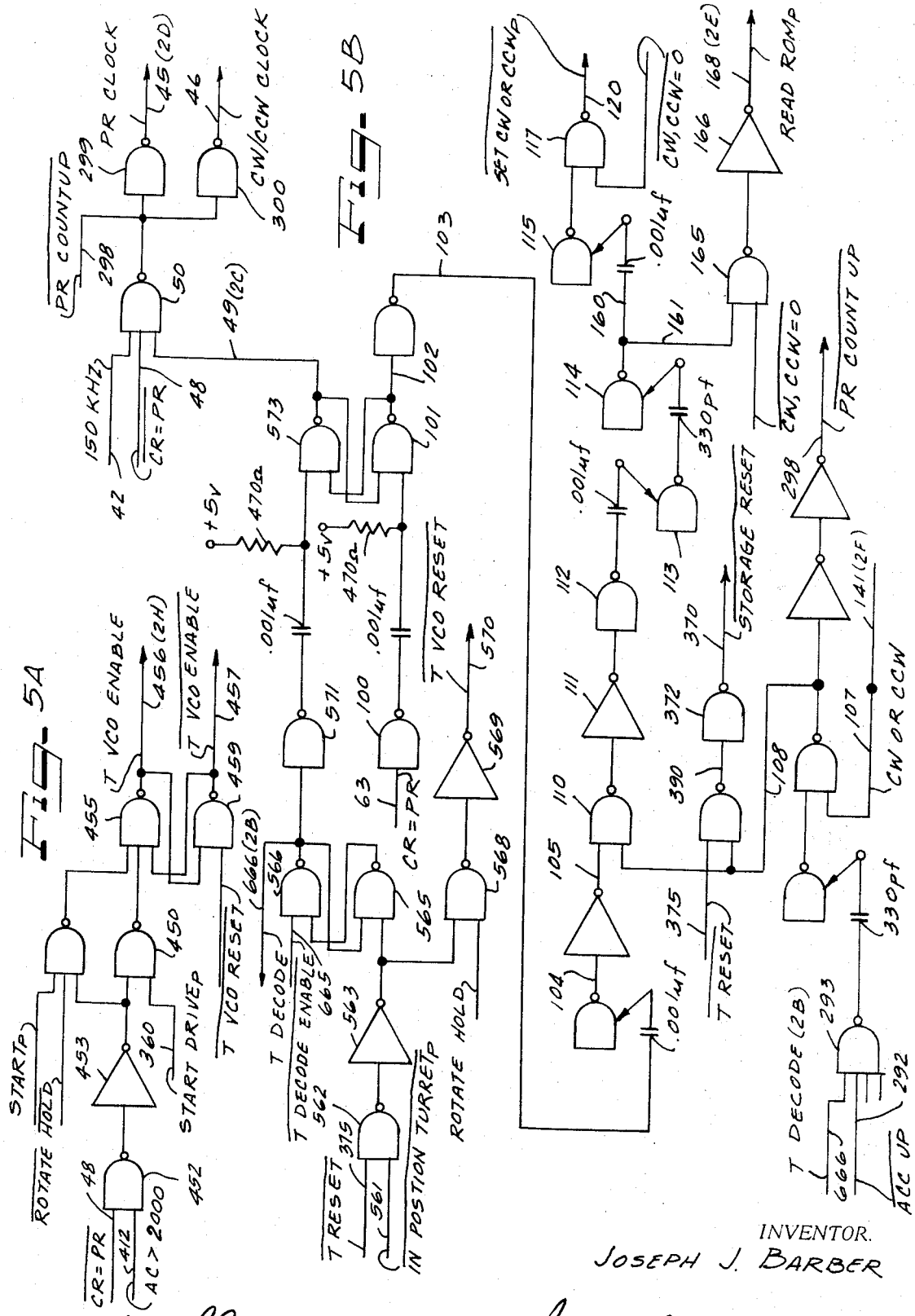

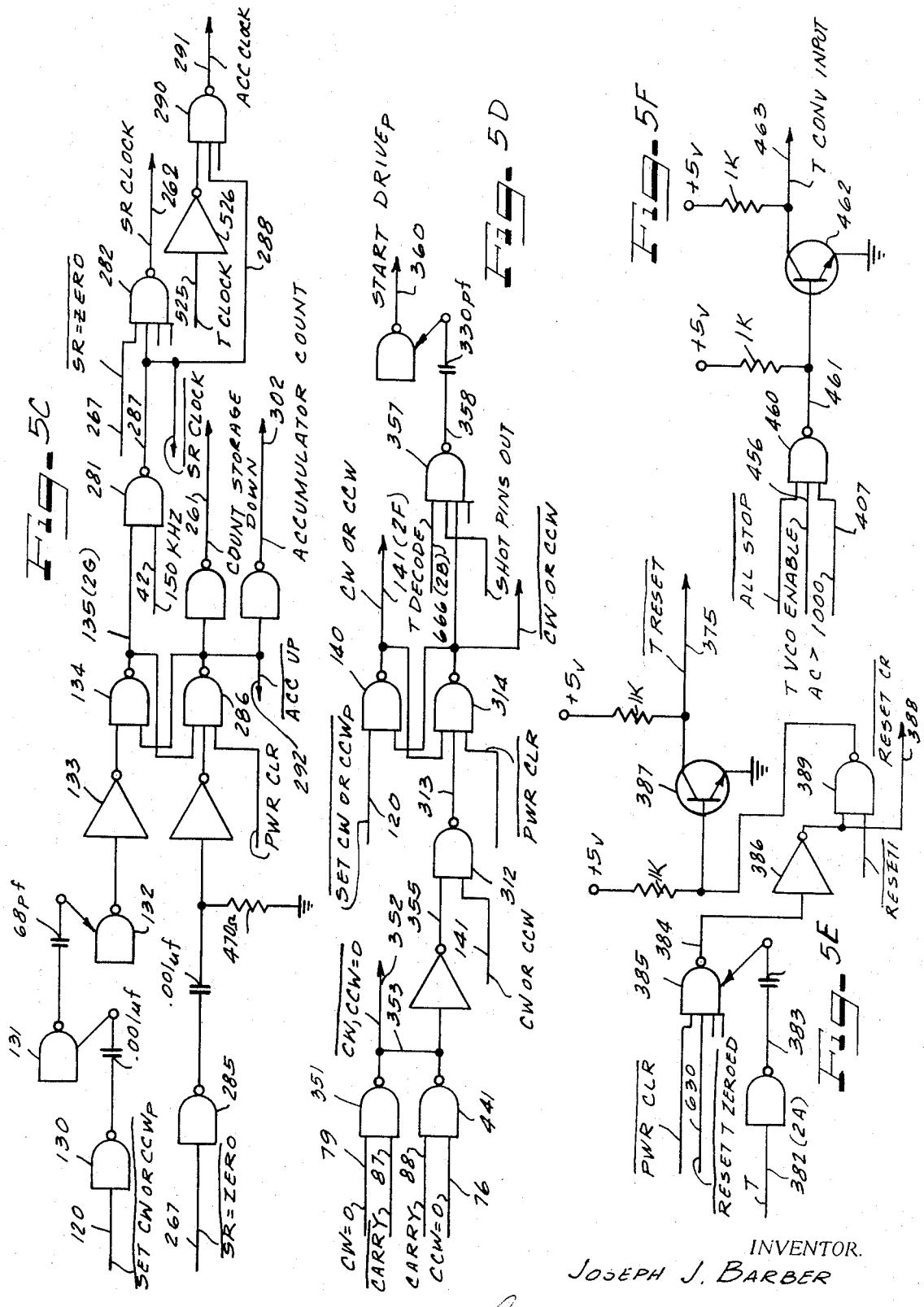

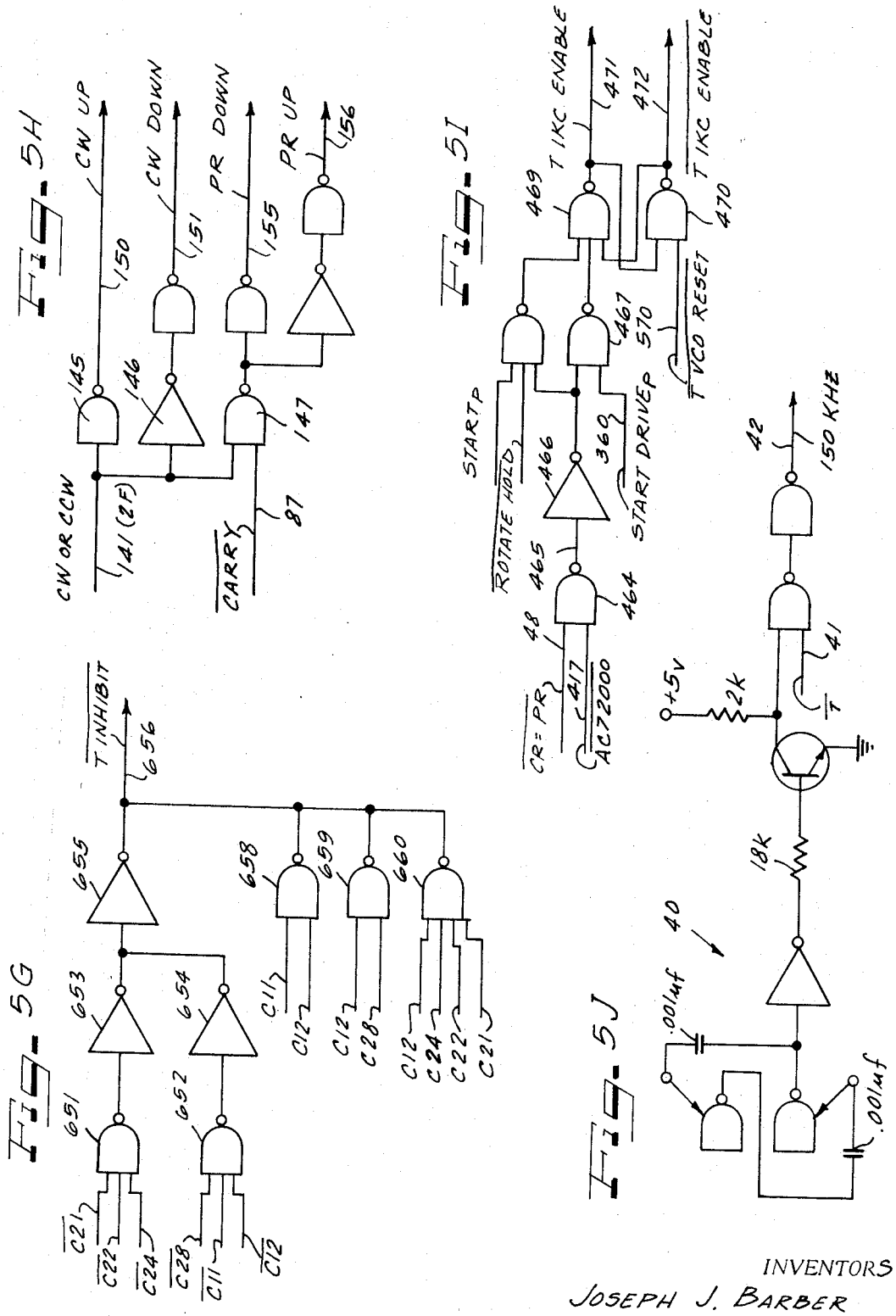

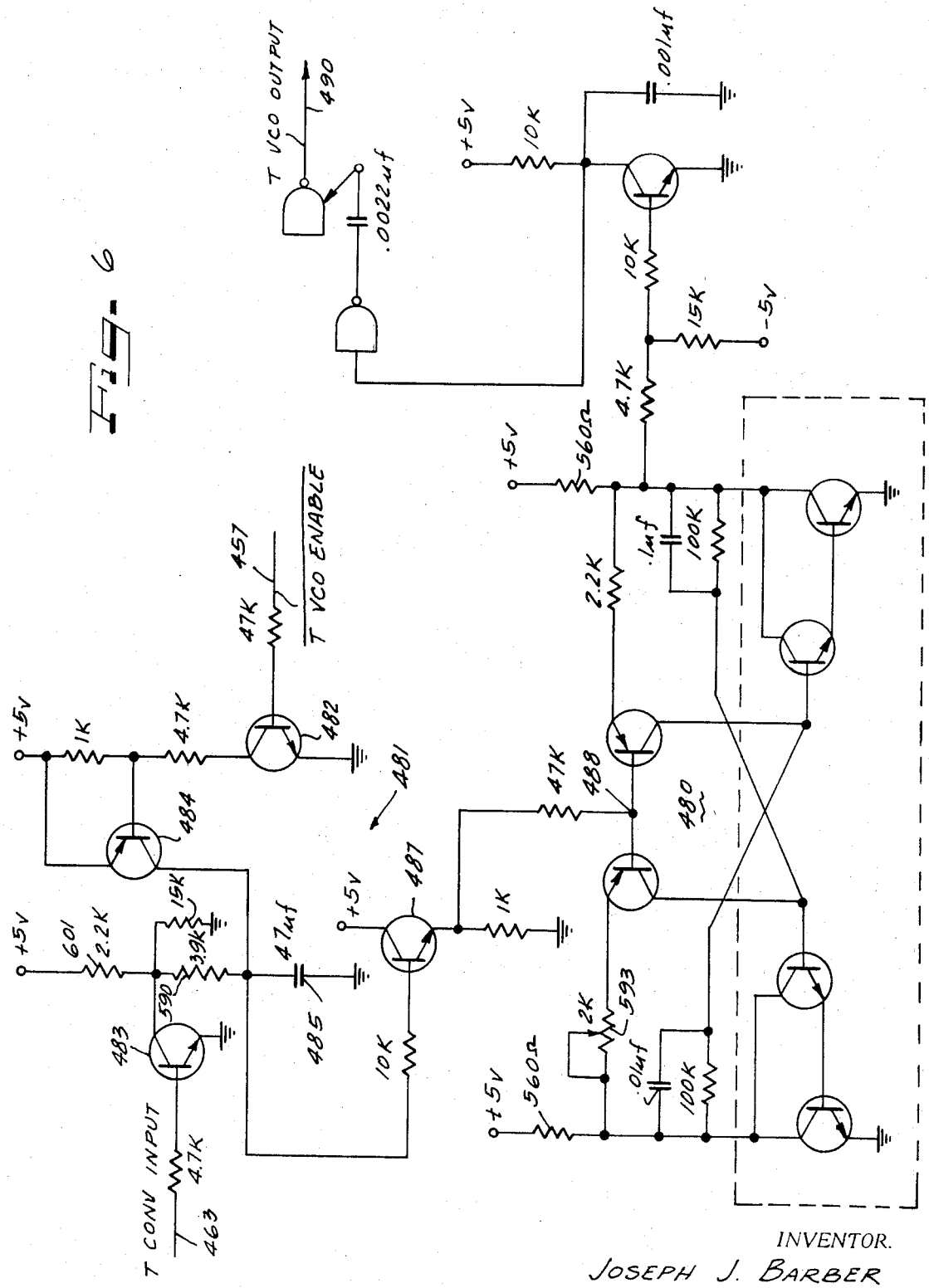

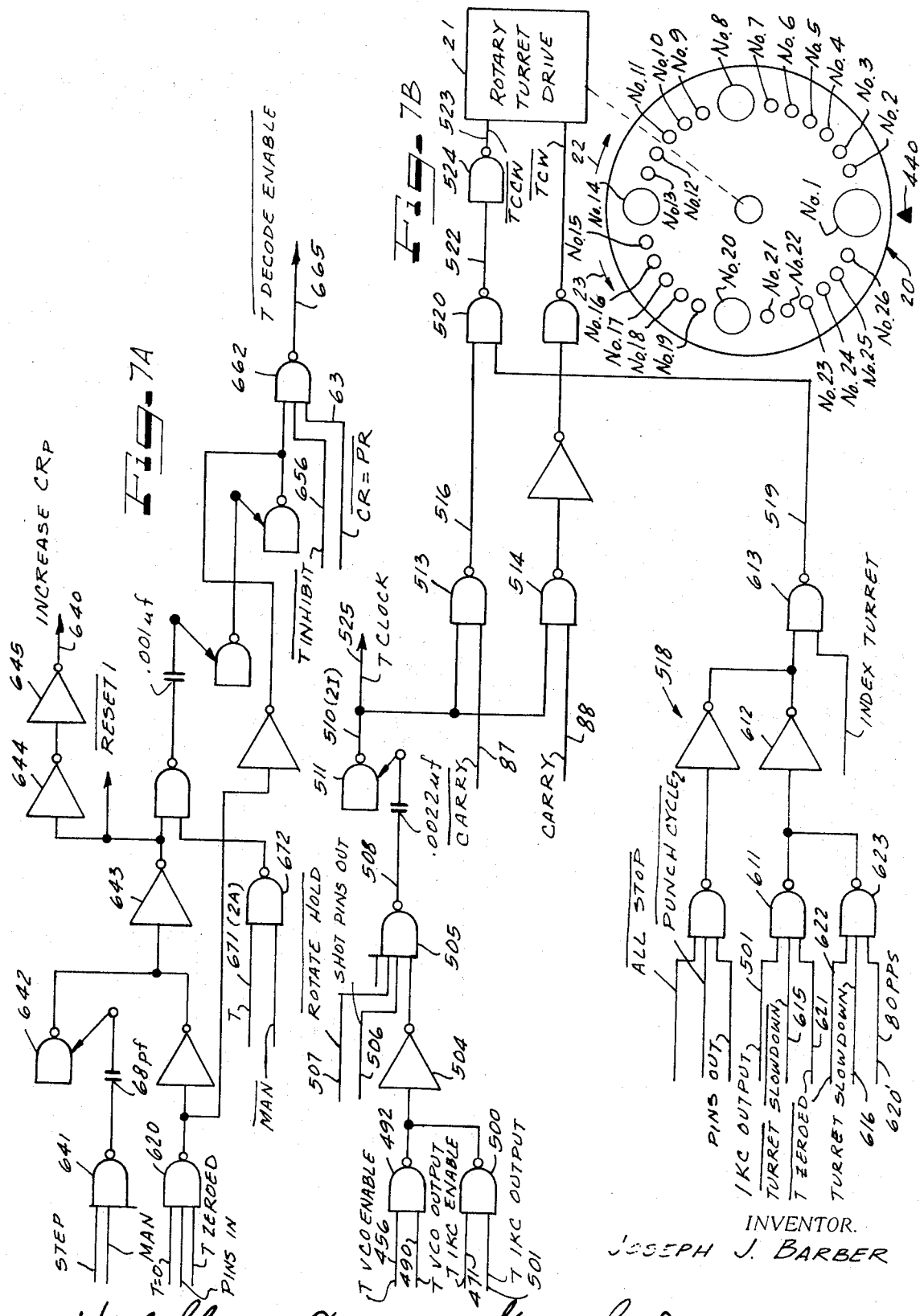

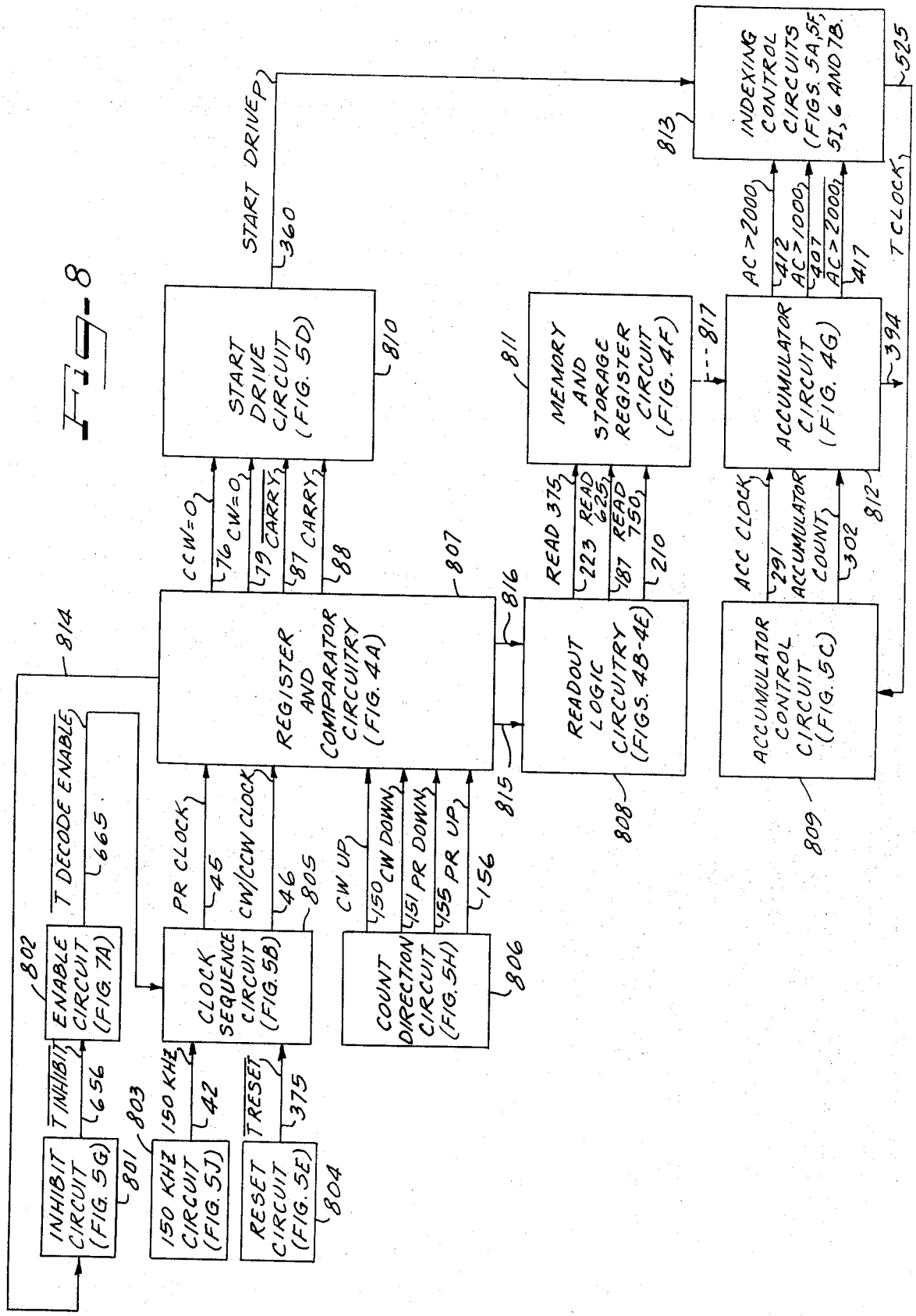

3,774,100

TURRET INDEXING MOTOR CONTROL SYSTEM

CROSS REFERENCES TO RELATED APPLICATIONS

Various aspects of an overall system including the features of the present application are found in commonly owned pending applications Barber U.S. Ser. No. 839,971 filed July 8, 1969, now U.S. Pat. No. 3,622,763 issued Nov. 23, 1971, and Schober U.S. Ser. No. 862,383 filed Sept. 30, 1969.

The present application is a continuation in part of a commonly owned pending application Barber U.S. Ser. No. 77,139 filed Oct. 1, 1970 now U.S. Pat. No. 3,675,107 issued July 4, 1972.

The disclosures of each of the pending applications is hereby incorporated herein by reference.

SUMMARY OF THE INVENTION

This invention relates to an indexing control system and particularly to a bidirectional rotary indexing system for the turret of a punching press or the like.

It is an object of the invention to provide a relatively economical and reliable indexing control system applicable to rotary turrets and the like having unequal spacing between certain of the successive indexing stations.

A further object of the present invention is to provide a particularly efficient bidirectional rotary indexing control system capable of providing relatively rapid indexing between randomly selected indexing stations.

Other objects, features and advantages of the invention will be readily apparent from the following detailed description of certain preferred embodiments thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a schematic block diagram illustrating a basic arrangement of components in accordance with the present invention;

FIG. 2, consisting of FIGS. 2A through 2I, shows a timing diagram useful in explaining an embodiment of the present invention;

FIG. 3 is a plot of frequency as a function of time, illustrating the generation of indexing pulses during the execution of a relatively longer indexing movement in an embodiment of the present invention;

FIG. 4, consisting of FIGS. 4A through 4G, is a schematic diagram illustrating detailed circuitry for the same embodiment to which FIGS. 2 and 3 pertain;

FIG. 5, consisting of FIGS. 5A through 5J, illustrates the details of typical sequencing logic for the embodiment of FIGS. 2–4;

FIG. 6 illustrates detailed electric circuitry for generating turret indexing pulses for the embodiment of FIGS. 2–5;

FIG. 7, consisting of FIGS. 7A and 7B, illustrates details of the indexing drive control logic for the embodiment of FIGS. 2–6; and FIG. 8 is a diagrammatic illustration for the purpose of indicating certain major interconnections between the circuits of FIG. 4–7.

DESCRIPTION OF THE PREFERRED EMBODIMENTS

FIG. 1

FIG. 1 illustrates the relationship of the major components of the preferred embodiments of the present invention.

In one embodiment in accordance with FIG. 1, which is described in detail in said copending application Ser. No. 77,139 filed Oct. 1, 1970, command data source 10 is illustrated as a tape reader (12), the numbers in parentheses herein referring to the references numerals of said copending application. The command data is supplied to a command register 11, designated by the character CR herein. In the prior embodiment, a turret (10) is shown as having 26 tool stations, and a position register (16) corresponding to position register 12 of FIG. 1 maintains a count in binary coded decimal notation to represent the present turret position. Comparator 13 of FIG. 1 would include comparator component (18) and register components (28) and (30) of the prior embodiment for determining the direction of turret indexing movement which would traverse less than one half of the total number of stations. Component 13 may, however, use instead simple comparison logic for comparing the numbers in registers 11 and 12 and for instantaneously indicating the shortest path or preferred indexing direction.

Once the desired indexing direction has been determined, the position register is utilized to control readout from a read only memory and readout logic component such as indicated at 14, FIG. 1, and as represented by components (44) and (48) of the prior application. In the prior disclosure, if it were determined, for example, that the turret (indicated diagrammatically in the second figure of the prior application) were to be indexed in the clockwise direction from station No. 1 to station No. 8, then with the present position register showing the present position at station No. 1, the memory component (48) would supply the number 750, indicating that 750 indexing pulses are required from the indexing pulse generating circuits such as indicated at 15, FIG. 1, and at (50) and (52) of the prior disclosure. The indexing pulse generating circuits would then supply 750 pulses to the pulse reponsive indexing drive as represented at 16, FIG. 1, and as represented by component (11) of the prior application.

The position register 12 would then be indexed by one count so as to represent turret position number 2, and component 14 would be controlled to supply a number, specifically 625, indicating that the number of indexing increments between station No. 2 and station No. 3 corresponds to 625 indexing pulses. Thus, with the prior arrangement, when the turret reached the commanded position as represented by the number in register 11, the position register 12 would also contain the same number, which would continue to represent the present position of the turret.

If in the prior disclosure, it were determined that indexing in the opposite or counterclockwise direction was preferred, the present position as contained in position register 12 would again control the read only memory component 14, but this time in conjunction with a counterclockwise direction signal, so that the component 14 would provide the required number of indexing pulses to move from station No. 1, for example, to station No. 26 (referring to the second figure of the prior application). In this case, the position register 12 would be counted in a downward direction, so that the first counting pulse supplied to the position register 12 would cause the register to count from the number 1 to the number 26. The next readout from component 14 would then be controlled by the present position value of 26 in register 12 in conjunction with the desired counterclockwise indexing polarity. This prior embodiment is disclosed in the prior application Serial 77,139, and which disclosure is incorporated herein by reference.

In a second embodiment, which represents a present commercial system in successful operation, the specific arrangement is as illustrated in FIGS. 2 through 7 hereof. As will be hereinafter explained in greater detail, this embodiment reads out the indexing pulse values from component 14 as the position register 12 steps through the desired sequence of stations such as from station 1 through station 8, for clockwise indexing, or such as from station 1 through stations 26, 25, 24 and 23 for counterclockwise indexing. For example if the turret is to move from station 1 to station 23, the position register 12 may be initially counted in the "up" or positive direction to station 23, at which time the logic component 13 will indicate the condition CR = PR. The logic 13 is such that if the position register 12 has been counted through more than 13 steps, the position register 12 will now be counted from position value 23 through position values 24, 25, 26 and back to 1, at the same time controlling the logic of 14 so as to accumulate in component 15 a total indexing pulse value corresponding to the number of indexing pulses required to index the turret from position number 1 to position number 23 as the turret moves in the counterclockwise, or preferred direction. With the position register 12 now showing the correct position (position number 1), the indexing pulse accumulated value of component 15 is utilized to steadily supply indexing pulses to the drive component 16 sufficient to drive the turret directly from position number 1 to position number 23 along the shortest or preferred path, specifically the counterclockwise indexing direction. In the particular embodiment illustrated, even after the turret has arrived at the desired position number 23, the present position register 12 will remain with a count value of 1. The circuit is arranged, therefore, to transfer the contents of the command register 11, in this case a count value of 23 in binary coded decimal notation, to the position register 12, so that the position register 12 will then again show the correct position of the turret.

With this general arrangement, further simplifications may be made, for example as position register 12 is counted in the positive direction initially, the successive count values between 1 and 23, for example, can be read out of component 14 and stored in an accumulator register of component 15. If now the accumulator register has a total count capacity corresponding to the number of indexing pulses required for 360° of turret indexing movement, the indexing direction corresponding to the shortest path of movement between station number 1 and station number 23 can be determined by observing whether the count in the accumulator corresponds to more than or less than 180° of turret indexing rotation. If the accumulation of indexing pulses corresponds to more than 180° of indexing movement, the accumulator can be counted in the up direction toward its full count condition, and the number of pulses required to reach the full count value will represent the number of indexing pulses to move from station number 1 to station number 23 in the shortest path direction.

On the other hand, for the case of a move from station number 1 to station number 8, the numbers of indexing pulses would be accumulated as the position register is stepped from a count of 1 to a count of 8. In this case, however, the accumulated indexing pulse count value would correspond to a count value of less than 130°, and the accumulator would be counted in the down direction to a zero count value in generating the number of indexing pulses corresponding to clockwise indexing movement between station number 1 and station number 8. Thus the direction logic of component 13 may respond to the reaching or failure to reach an indexing pulse count value corresponding to 180° of indexing movement in the accumulator of component 15, or the direction logic may respond directly to the numbers registered in components 11 and 12 and instantaneously indicate the preferred indexing direction prior to any actuation of the position register 12 in generating the necessary number of indexing pulses. Where direction logic is used in component 13, the position register 12 need only be counted in the preferred direction, and the accumulator of component 15 need only have a capacity corresponding approximately to 180° of indexing movement, the accumulator registering the number of indexing pulses for the preferred indexing direction in each case, and being counted down to zero to generate the necessary number of indexing pulses regardless of the indexing direction.

The implementation of each of the foregoing embodiments will be apparent from the disclosure of the prior application Ser. No. 77,139, and from a disclosure of the present commercial embodiment in conjunction with FIGS. 2 through 7 of the present application.

Embodiment of FIGS. 2-7

The object of the commercial system illustrated in FIGS. 2–7 is to position a punching press turret such as indicated at 20, FIG. 7B, which is driven by an electrohydraulic pulse motor (EHPM) as represented by rotary turret drive component 21, FIG. 7B. As indicated in FIG. 7B, the turret 20 has 26 tool stations and can be driven either in the clockwise direction as represented by arrow 22 or in the counterclockwise direction as indicated by arrow 23 in FIG. 7B.

When the system is controlled by means of a tape reader as represented by component 10, FIG. 1, the new turret station is read from punched tape and stored in the command register indicated at 11 in FIG. 1 and comprising specifically a presettable binary coded decimal up counter component 30, FIG. 4A. As soon as the tape reader stops, a "Start Decode" pulse is generated to enable the decoding process. During the decoding process, the command position is supplied to input lines 31–36 of register 30 for the purpose of setting the successive stages to represent the turret position supplied by the tape reader. The respective input lines 31–36 may set respective stages of register 30 having weights of one, two, four, eight, ten and twenty, respectively.

Thereafter, a 150 KHZ clock indicated at 40, FIG. 5J, is gated at such time as the T̄ input 41, FIG. 5J, becomes true. The "150 KHZ" output at line 42, FIG. 5J, connects with the correspondingly labeled input line shown at the upper right in FIG. 5B. Referring to FIG. 5B, the upper right, the condition for transmission of 150 kilohertz pulses at outputs 45 and 46 is a true condition at inputs 48 and 49 to NAND gate 50.

When a count is introduced into register 30 which differs from the count in the present position register 60, comparator component 61 will provide a true output at the line $\overline{CR=PR}$, and this output has been given the reference numeral 48 in conformity with the input line 48, FIG. 5B (The term "true output" and the term "relatively high potential" are used herein to refer to one of the logical potential levels utilized in the illustrated embodiment, this level being roughly about plus five volts. The other logical potential level is zero volts, herein referred to as ground potential.) The second output CR=PR from comparator 61 has been designated by the reference numeral 63.

The position register 60 is an up/down binary coded decimal counter capable of counting from 01 to 26 so as to represent the successive stations of the turret 20, FIG. 7B. The signal PR CLOCK from FIG. 5B is supplied to input 45 of position register 60, while the signal CW/CCW CLOCK is supplied to the CCW register 70 and the CW register 71, FIG. 4A. The CCW register is a down binary counter with a capacity to count from zero through 12, while the CW register 71 is an up/down binary counter with a capacity to count from zero through 13.

Thus, during automatic operation, the 150 KHZ pulses are supplied to registers 60, 70 and 71 until such time as the comparator 61 signals that the count in position register 60 is equal to the count in command register 30.

With respect to the CCW register 70, the complement outputs from the successive stages having weights of one, two, four and eight have been designated $\overline{CCW1}$, $\overline{CCW2}$, $\overline{CCW4}$ and $\overline{CCW8}$. The inputs to the NAND gate 75 at the upper right in FIG. 4A are coupled with the outputs of the stages of register 70 such that all of the inputs to gate 75 will be true (i.e. at the true output potential) when the register contains a value of zero. At this time the output line 76 will show a true condition. Similarly CW register 71 has four stages with respective complement outputs designated $\overline{CW1}$, $\overline{CW2}$, $\overline{CW4}$ and $\overline{CW8}$ which are coupled to NAND gate 78 such that the output at line 79 will be true when the CW register contains a zero. The inputs to NAND gate 81, at the lower right in FIG. 4A, from the indicated direct or complement outputs of the respective stages of register 71 are such that the output of gate 81 will register a ground potential when the CW register 71 registers a value of 13. Because of inverter 82, conductor 83 will be at a relatively high potential for a value of 13. Thus the next CW/CCW CLOCK signal at the input to NAND gate 85 at the lower left in FIG. 4A will cause conductor 87 to exhibit ground potential while conductor 88 exhibits a relatively high (true) potential condition. Thus, if the position register must be stepped in response to more than 13 pulses in order to reach a value equal to that of the command register 30, the CARRY output line 88 will show a true condition, indicating that the turret is to be indexed in the counterclockwise direction (indicated by arrow 23, FIG. 7B). On the other hand, if the output at conductor 87 is true, this signifies a clockwise indexing direction as indicated by arrow 22, FIG. 7B.

With the signal CR=PR true at output 63 of comparator 61, the system is in condition for the transfer of the required number of indexing pulses to storage register 90, FIG. 4F, under the control of the count values in the position register 60. For advising comparator 61 of the numbers in the command register 30 and the position 60, cables are indicated at 93 and 94, each containing twelve conductors, which have been designated respectively $\overline{C21}$, C21, $\overline{C22}$, C22, $\overline{C24}$, C24, $\overline{C28}$, C28, $\overline{C11}$, C11, $\overline{C12}$, and C12, and $\overline{T21}$, T21, $\overline{T22}$, T22, $\overline{T24}$, T24, $\overline{T28}$, T28, $\overline{T11}$, T11, $\overline{T12}$ and T12. It will be understood by those skilled in the art that the output conductors $\overline{C21}$ and C21, for example, represent the complement and direct outputs of the first stage of the command register 30, and so on.

To trace the specific circuit operation, when output 63 of comparator 61 becomes true, the input CR=PR becomes high at the input to gate 100, in the upper part of FIG. 5B, transmitting a low going pulse to NAND gate 101, producing a high output at 102 and a low going output at 103. (The term "low going" as used herein refers to an output potential decreasing from the true logical potential level toward ground potential. A "positive going" output refers to an output potential which is increasing toward the true logical potential level). The low going output at 103 produces a positive going output at 104, and a low going output at 105 in FIG. 5B. Since the input CW OR CCW at input conductor 107 is at ground potential, at the lower left in FIG. 5B, conductor 108 is at a relatively high potential, and the low going signal at input 105 to NAND gate 110 produces a positive going input to inverter 111, a low going input to a gate 112 and a positive going input to a gate 113. This produces a low going input to a gate 114 and a positive going input to a gate 115. The result is a low going input pulse to NAND gate 117 and a positive going pulse at output line 120 which is designated $\overline{SET\ CW\ OR\ CCWp}$. (The letter p associated with the notation at a given conductor indicates that a pulse type signal is of interest). The low going trailing edge of the pulse at 120 is supplied to the input of NAND gate 130 at the upper left of FIG. 5C, and this signal is transmitted via gates 131, 132 and inverter 133 to provide a low going pulse at the input to NAND gate 134. The result is a relatively high potential condition at conductor 135, conditioning the circuitry of FIG. 5C for the readout of indexing pulses.

The same low going portion of the pulse at output 120, FIG. 5B, is supplied to input $\overline{SET\ CW\ OR\ CCWp}$ of NAND gate 140, shown at the central part of FIG. 5D, providing a relatively high potential condition at output conductor 141.

The CW OR CCW output at conductor 141 is supplied to the correspondingly labeled input to components 145–147 of FIG. 5H. The result is that the output 150 assumes a ground potential condition, and the output 151 assumes a relatively high potential condition. Thus, the CW register 71, FIG. 4A, is conditioned to operate in a down direction.

If the CW register had exceeded its capacity, the $\overline{CARRY}$ output 87 at the lower center of FIG. 4A would be at a ground potential to maintain conductor 155, FIG. 5H, at ground potential and output conductor 156 at a relatively high potential, conditioning the present position register 60 to continue counting in the up or positive direction.

Conversely, if the CW register 71 had not exceeded its capacity, the output conductor 87 at the lower center in FIG. 4A would be at a relatively high potential condition, causing output conductor 155, FIG. 5H, to be at a relatively high potential condition and output conductor 156 to be at ground potential. This in turn would condition the present position register 60 to count in the down or negative direction.

If the $\overline{\text{CARRY}}$ signal is true at the output conductor 87 at the lower center of FIG. 4A, the CW register 71 will contain (in binary form) the number of stations to be traversed to reach the new station (represented by the number in command register 30). If a carry was generated, the CCW register 70 will contain (in binary form) the number of stations to be traversed in the counterclockwise direction to reach the commanded station.

Referring to the circuitry of FIG. 5B, it will be recalled that a positive going pulse is generated at conductor 160 at the output of gate 114, at the lower right in FIG. 5B, in response to the condition CR=PR at the input to gate 100, at the upper center of FIG. 5B. This positive going pulse is supplied via conductor 161 to the input of NAND gate 165 producing a low going pulse at the input to inverter 166 and a positive going pulse at the output 168 at the lower right of FIG. 5B. The READ ROMp pulse thus generated is utilized by the circuitry of FIGS. 4B–4F to transfer the correct number of indexing pulses to the storage register 90, FIG. 4F.

Referring first to FIG. 4B, the inputs to binary coded decimal to decimal converter component 170 are designated T21, T22, T24 and T28. These respective conductors are connected with the direct outpus of the lower order stages of position register 60 which have the same designation in FIG. 4A. If, for example, the position register has a count value of eight (PR=08) at the beginning of a readout operation, the conductor T28, FIG. 4B, would have a positive potential above ground, causing a corresponding positive potential to appear at output conductor 171.

Referring to FIG. 4D, complement output lines $\overline{\text{T11}}$ and $\overline{\text{T12}}$ from the higher order stages of position register 60 would each be true. The conductors have been designated by reference numerals 175 and 176 in FIGS. 4A and 4D, and produce a ground potential output from gate 178, FIG. 4D, and a true potential at conductor 179, which bears the notation 00. Gate 181, FIG. 4C, thus has inputs 171 and 179 both true for PR=08, and conductor 183 is at ground potential. The relatively high potential condition at conductor 184 enables gate 185 to provide a positive going pulse at conductor 187, while inverter 188 provides a ground potential at the output conductor labeled $\overline{625}$.

Referring to FIG. 4E, various of the inputs to NAND gates 201–203 result in a relatively high potential at conductor 205, a ground potential at conductor 206 and ground potential at output conductor 210. Specifically, as to gate 201, for PR=08, the 00 input 179 would be true, but line 197 would not be true for PR=08, and thus is at ground potential. The label 1 for conductor 191 signifies, of course, that this conductor will have a true potential level if and only if input $\overline{\text{T21}}$ to converter 170, FIG. 4B, is at ground potential and conductors $\overline{\text{T22}}$, $\overline{\text{T24}}$ and $\overline{\text{T28}}$ are at the true potential level (regardless of whether the value in the position register is 01, 11, or 21.

Referring to the CW input to gate 202, FIG. 4E, it will be noted that if the input conductor 88 to gate 215, FIG. 4E, is at ground potential, the output conductor 216 will be at a relatively high potential. However, for the example (PR=08), the 2 conductor 218 from converter 170, FIG. 4B, will be at ground potential, disabling gate 202, FIG. 4E, and enabling the conductor 205 to be at the relatively high potential condition. Conductor 205 is connected with conductor 219 labeled $\overline{750}$ which is thus at the relatively high potential condition, but the input labeled $\overline{625}$ at the input to gate 220 disables the gate, and maintains conductor 222 at a relatively high potential level and conductor 223 at ground potential.

The conductors 223, 187 and 210 from the three inputs to a read only memory diagrammatically indicated at 230, FIG. 4F. As will be understood in the art, the read only memory 230 may be implemented by means of inverters which have been connected with the inputs designated READ 375, READ 625 and READ 750 so as to provide pulses on selected ones of the output lines, represented by the vertical lines in FIG. 4F leading to the storage register 90. Where the storage register 90 is implemented as a presettable binary down counter, the successive vertical input lines may represent, from left to right as viewed in FIG. 4F, the binary weights of 1, 2, 4, 8, 16, 32, 64, 128, 256, and 512. The small circles at the intersections of the respective three input lines of read only memory 230 and selected ones of the vertical lines represent those inverters of the read only memory which would be activated to provide an output to the storage register 90. Thus if the upper input line of memory 230, designated READ 375, receives a positive going pulse, a low going pulse would appear at the vertical lines having weights of 1, 2, 4, 16, 32, 64, and 256. Thus pulsing of the upper input line to the read only memory 230 would cause the storage register to be set to a count of 375 (decimal). Similarly if the input line 187 is pulsed as is the case for the example PR=08, the vertical lines of the read only memory 230 having weights of 1, 16, 32, 64, and 512 will receive low going pulses, causing the decimal number 625 to be represented in the storage register 90. Finally, if the lower input line designated READ 750 is pulsed, the vertical lines having weights of 2, 4, 8, 32, 64, 128 and 512 would receive low going pulses from the inverters of the read only memory 230, causing the storage register 90 to be preset to a decimal count of 750.

Referring to FIG. 7B, the numbers of indexing pulses required to move from station number 8 to station number 7, or from station number 8, to station number 9 is 625, so that the input line 187 of the read only memory 230 is pulsed when the position register 60 shows a position of 08, regardless of whether the indexing movement is to be clockwise or counterclockwise. The spacing between stations number 2 through 7, 9 through 13, 15 through 19 and 21 through 26 corresponds to 375 indexing pulses, so that the circuitry of FIGS. 4B through 4E causes the activation of the input line READ 375 of the read only memory 230 whenever indexing is to take place between successive pairs of these stations. The distances between stations 13 and 14, 14 and 15, 19 and 20, and 20 and 21, is 625 indexing pulses, so that the input line 187 of the read only memory 230 is also activated when these indexing distances are required. Thus referring to FIG. 4C, the NAND gate 181 responds when movement is to take place from station number 8 to station number 9 or from station number 8 to station number 7. Similarly NAND gate 240 responds when indexing is to take place in either direction from station number 14, and NAND gate 241 responds when indexing is to take place in either direction from station 20. NAND gate 242 responds when the position register shows a count of 7 and the condition of conductor 88 corresponds to actual indexing of the turret in the counterclockwise direction, (that is from station number 8 to station number 7). Gate 243 responds for a position count of 13, and a condition of the lower input 88 indicating indexing in the counterclockwise direction, (that is from station number 14 to station number 13). Gate 244 responds for a position count of 19, where the condition of the lower input 88 corresponds to actual counterclockwise indexing movement of the turret, (from station number 20 to station number 19). Similarly, gates 245–247 respond to present count values of 9, 15 and 21, providing the potential of the third lower most input 216 to each gate signifies that the turret is to rotate in the clockwise direction, (that is from station number 8 to station number 9, or from station number 14 to station number 15, or from station number 20 to station number 21).

The spacing between station number 26 and station number 1, and between station number 1 and station number 2 corresponds to 750 indexing pulses, and this fact is reflected in the inputs to NAND gates 201–203. Thus gate 201 responds whenever the present count value is 01, gate 202 responds for a present count value of 02 providing indexing is to take place in the clockwise direction, and gate 203 responds for a present count value of 26 providing indexing is to take place in the counterclockwise direction. Gate 220, FIG. 4E, responds if none of the previously mentioned gates 181, 201–203 and 240–247 responds, since in all other cases the number of indexing pulses required is equal to 375.

After the required number of indexing pulses has been entered into the storage register 90, FIG. 4F, the input lines 261 and 262 of the storage register are activated to count the storage register down to zero, at the same time as pulses are entered into the accumulator component 265, FIG. 4G. When the storage register 90 reaches a count of zero, NAND circuit 266 provides a ground potential signal at output line 267 to interrupt the entry of pulses into the accumulator 265. Thus, the number initially in the storage register 90 is transferred to the accumulator 265, which for the example PR=08 would initially receive a count of 625 (decimal). By way of example, the accumulator 265 may be an up-/down binary coded decimal counter.

To refer to the specific exemplary sequencing circuitry, at the termination of the pulse designated READ ROMp and the pulse designated SET CW OR CCWp which are generated in the circuitry of FIG. 5B, gates 281 and 282, FIG. 5C, enable the generation of 150 kilohertz pulses at output 262 of gate 282 until such time as input 267 to gate 232 returns to ground potential when SR=ZERO becomes true. At the same time input 267 to gate 285, at the left in FIG. 5C, goes to ground, producing a positive going pulse at the output of gate 285 and a negative going pulse at the input of gate 286. The result is a ground potential at conductor 135, disabling gate 281 and discontinuing pulses from the 150 kilohertz oscillator of FIG. 5J. Prior to disabling of gate 281, the 150 kilohertz pulses were transmitted to the output 287 of gate 281 and to conductor 288 leading to an input of gate 290, the output 291 of gate 290 supplying input pulses to the accumulator 265, FIG. 4G, in step with the pulses supplied to conductor 262 at the input of storage register 90.

With the output of gate 286, FIG. 5C, once more at the relatively high potential condition, output conductors 261 and 302 are returned to ground potential disabling storage register 90 and accumulator 265. When the signal $\overline{SR=ZERO}$ at output line 267, FIG. 4F, returns to ground potential, the true potential at conductor 292 ($\overline{ACC\ UP}$) at the output of gate 286, FIG. 5C, is applied to an input of gate 293 in the lower left of FIG. 5B, during output 298 ($\overline{PR\ COUNT\ UP}$) low. This conductor 298 leads to the input of gates 299 and 300, FIG. 5B, so that a pulse is supplied to position register 60, (pulse 301, FIG. 2D), and to CCW register 70 and CW register 71. As indicated by the logic of FIG. 5H, for the case of clockwise indexing where the input 87 to gate 147 is at a relatively high potential, a relatively high potential is present at output 155, causing the position register to count down one count, for example to the condition PR=07, while CCW register 70 and CW register 71 would operate in the down mode, with register CW, for example, shifting from CW=07 to CW=06 for the case of a move from turret station number 1 to turret station number 8. With the position register showing a count of 07, and output line 87, at the lower part of FIG. 4A, being at a relatively high potential, the circuitry of FIG. 4 would activate conductor 223, FIG. 4F, so as to transfer a count of 375 to storage register 90. This count would then be transferred to the accumulator 265, which would then exhibit an accumulated count of 625 + 375 or 1,000 (decimal). This sequence of steps would continue until the position counter was stepped to a count value of 02, whereupon the circuitry of FIG. 4 would respond at gate 202 to provide a ground potential at conductor 205 and a positive going pulse at output 210, FIG. 4E, resulting in the transfer of the number 750 to storage register 90. After this count value was transferred to accumulator 265, the accumulator 265 would show an accumulated count value of 3,250 (in decimal notation). This number of indexing pulses is that required to index the turret from station number 1 to station number 8 in the clockwise direction as viewed in FIG. 7.

When the storage register again reached a zero count, the CW counter 71 would be stepped from a count value of 01 to a count value of zero, causing output 79, FIG. 4A, to go to a positive potential above ground. At this time, both inputs to gate 351, at the left of FIG. 5D, would be in the relatively high potential condition providing a ground level signal at conductors 352 and 353, and a positive potential condition at conductor 355. The result is a negative going pulse at conductor 313, providing a relatively high potential condition at the output of gate 314. With the other input conditions to gate 357 satisfied, the result will be a negative going pulse at output line 358 and positive going pulse at output line 360, calling for the initiation of the actual indexing movement of the turret, for a number of indexing pulses equal to the number stored in the accumulator 265.

Before describing the actuation of the indexing pulse generating circuits shown in FIGS. 6 and 7, it may be helpful to trace certain further circuit details which control operation during the transfer of successive counts from the storage register 90 to the accumulator 265. Thus, in FIG. 4D, it will be observed that if conductor 175 is at ground potential, conductor 361 which is designated by the notation TEN will be true signifying that the stage of the position register 60 having a weight of ten is in the logical ONE representing condition. Similarly, if input conductor 176 is at ground potential, output conductor 362 bearing the notation TWENTY will be true, signifying that the highest order stage of position register 20 is in the logical ONE representing condition. Since position register 60 has a count capacity of 26, conductors 175 and 176 of FIG. 4D cannot both be at ground potential simultaneously.

Referring to FIG. 4C, it will be observed that gate 240 is actuated for a count of 14 by virtue of its control from conductor 361 of FIG. 4D as well as by conductor 364 of FIG. 4B. From the foregoing examples, the operation of the circuitry of FIGS. 4B through 4E for the different possible count values in the position register 60 will be apparent to those skilled in art.

Referring to FIG. 4F, the storage register 90 may consist of ten J-K flip-flops which are presettable to a logical ONE representing condition in response to a low going pulse such as produced when the inverters of a memory component 230 have their inputs driven by a positive pulse. Specifically, the inverters respond to such a positive pulse by switching their output potential from a relatively high positive value such as about plus five volts toward ground potential. Before a new indexing cycle begins, a $\overline{\text{STORAGE RESET}}$ signal is applied to conductor 370, FIG. 4F, for the purpose of resetting each of the flip-flops of the storage register to the logical ZERO representing condition. The $\overline{\text{STORAGE RESET}}$ signal originates from a gate 372 shown at the lower portion of FIG. 5B. Gate 372 is shown as being responsive to a ground signal at conductors 375 which is labeled $\overline{\text{T RESET}}$. The $\overline{\text{T RESET}}$ signal originates as indicated in FIG. 5E. Specifically a T flip-flop (not shown) is actuated in response to the T character read from punched tape. (If the parity and other conditions are met, the T flip-flop is reset soon after the T character is read to enable the beginning of an indexing cycle.) The positive pulse at the output of the T flip-flop is indicated at 381 in FIG. 2A. The symbol (2A) following reference numeral 382 in FIG. 5E is intended to indicate that potential of conductor 382 as a function of time is illustrated in FIG. 2A. This pulse 381 at input conductor 382, FIG. 5E, produces a low going signal at conductor 383 and a positive going signal at conductor 384 at the output of NAND gate 385. The positive going signal at the input to inverter 386 produces a low going signal at conductor 388 and a high going signal from gate 389. This signal at transistor 387 produces a low going pulse at output conductor 375. Referring again to the lower part of FIG. 5B, the low going pulse at conductor 375 provides a positive going pulse at conductor 390 and a low going pulse at the output conductor 370 which connects with the flip-flops of the storage register 90, FIG. 4F. As indicated in FIG. 4A, the $\overline{\text{T RESET}}$ signal at conductor 375 serves to reset the command register 30, CCW Register 70, CW Register, 71 and the bistable circuit formed by NAND gates 430 and 431 in preparation for the indexing operation.

Referring to FIG. 4G, the accumulator 265 may comprise a four stage binary coded decimal counter which is reset to a count of zero by the signal at conductor 375. The accumulator component 265 may include a series of inverters connected with the direct outputs of the respective flip-flop stages, the outputs of the respective inverters of the respective stages being indicated at the lower left in FIG. 4G and designated $\overline{\text{AC1}}$, $\overline{\text{AC2}}$, $\overline{\text{AC4}}$, $\overline{\text{AC8}}$, $\overline{\text{AC10}}$, $\overline{\text{AC20}}$, $\overline{\text{AC40}}$, $\overline{\text{AC80}}$, $\overline{\text{AC100}}$, $\overline{\text{AC200}}$, $\overline{\text{AC400}}$, $\overline{\text{AC800}}$, $\overline{\text{AC1000}}$, $\overline{\text{AC2000}}$, $\overline{\text{AC4000}}$ and $\overline{\text{AC8000}}$. These complement output conductors lead to a NAND circuit 393 having an output 394 responsive to the zero condition of the accumulator to provide a ground potential. Inverter 396 serves to provide a true potential at output conductor 398 when the accumulator is at a zero count.

Referring to the inputs of NAND gate 405, FIG. 4G, it will be observed that if the stage of the accumulator 265 having a weight of 1000, 2000, 4000, or 8000, is in the logical ONE representing condition, the conductor $\overline{\text{AC1000}}$, $\overline{\text{AC2000}}$, $\overline{\text{AC4000}}$ or $\overline{\text{AC8000}}$, will be at ground potential, and output conductor 407 of gate 405 will be at a true potential, signifying that the count in the accumulator is equal to or greater than 1000. Similarly, if the accumulator stage having a weight of 2000, 4000 or 8000 is in the logical ONE representing condition, the conductor $\overline{\text{AC2000}}$, $\overline{\text{AC4000}}$ or $\overline{\text{AC8000}}$ will be at ground potential, and the output conductor 412 of gate 413 will be at a true potential signifying that the count in the accumulator is equal to or greater than 2000. The output 417 from inverter 418, conversely, is true when the value in the accumulator is less than 2000.

While referring to FIG. 4G, it may be noted that as the accumulator is counted down to a zero count during the actual indexing of the turret, the ground potential which appears at conductor 394 at the output of NAND circuit 393 is supplied to the input of a gate 421 shown at the left in FIG. 4A. This serves to signal that the turret has completed its movement to the new position.

Having completed reference to the structural details of the circuitry of FIGS. 4B through 4G, it is appropriate to review in greater detail the operation of the system in transferring the required number of indexing pulses to the accumulator 265. For the case of a clockwise indexing movement, the CW Register 71 controls the countdown of the position register 60 and emits a true potential signal at conductor 79 (CW=0) when the transfer of the numbers of indexing pulses from the read only memory to the accumulator has been completed. To refer again to a specific example, if the turret is at station No. 1, and the command register 30 calls for indexing to station No. 8, the position register 60 is first counted up to the condition PR=80, at which time the CW Register will have a condition CW=07 (since seven pulses are required to step the position register 60 from a count of 01 to a count of 08). During the readout operation, the position register 60 supplies count values to converter 170, FIG. 4B of successively, 08, 07, 06, 05, 04, 03 and 02. During the time of these successive count values in the position register, the numbers of indexing pulses are supplied to accumulator 265 which are required to move the turret the distances between the following seven pairs of stations: from station 8 to station 7, from station 7 to station 6, from station 6 to station 5, from station 5 to station 4, from station 4 to station 3, from station 3 to station 2, and from station 2 to station 1. During these successive readout cycles, the CW register 71 will register values respectively of 07, 06, 05, 04, 03, 02 and 01. At the completion of the last readout cycle, the position register will be counted down to a count of 01 and the CW Register will be at the condition CW=0, terminating the readout operation.

As previously mentioned, a true potential condition at conductor 79 (CW=0) triggers a gate 351 at the left in FIG. 5D producing the START DRIVE$_p$ signal at output conductor 360.

To give an example for counterclockwise operation, suppose that the turret is at station No. 1 and the command register 39 receives a command to move to station No. 23. The CCW register is initially at CCW=0. As the present position register 60 is counted up from a value of 01 to a value of 23, the CCW Register receives 22 pulses causing the CCW Register to register the values CCW=12, CCW=11, CCW=10, . . . CCW=1, CCW=0, CCW=12, CCW=11 . . . CCW=4. It will be observed that if the turret is moved in the counterclockwise direction from station No. 1 through stations 26, 25 and 24 to station 23, the turret will have indexed four station intervals. At the same time that the CCW Register 70 is responding to the 22 input pulses in the down mode, the CW Register 71 will be responding to the same pulses in the up mode for the first 13 pulses. But when a 14th pulse is received, the CW overflows to place the output of gate 430 in a relatively high potential condition and to place the output of gate 431 at ground potential. Thus, the output of gate 433 at conductor 88 will be at the true potential level signifying that a counterclockwise indexing direction is preferred.

Referring to FIG. 5H, it will be observed that with conductor 87 at the ground potential level, conductor 156 will be at the true potential level, so that the position register, during the readout operation, will be progressively counted in the up direction for four counts in conformity with the initial condition of the CCW Register 70, specifically from a count value of 23 (PR=23), to a count value of 24, then a count value of 25, then a count value of 26, and then a count value of 1. The readout circuitry of FIGS. 4B through 4G is controlled by the successive count values PR=23, PR=24, PR=25 and PR=26 to read the numbers of indexing pulses required to traverse the distances, respectively, between the four pairs of station Nos. 23 and 24, 24 and 25, 25 and 26, and 26 and 1. It is immaterial, of course, that the numbers of indexing pulses required are supplied to the accumulator 265 in a reverse order in comparison to the order in which the successive stations appear during the actual indexing movement of the turret. (It will be noted, however, that the logic at the inputs of gates 202, 203, 242–244 and 245–247 differs from what might be expected, since the distances for clockwise indexing are accumulated by observing the conditions as to spacing in the counterclockwise direction from the station number in the position register, and vice versa for counterclockwise indexing. Thus gates 242–244 are enabled for the case where the actual indexing movement of the turret is to be counterclockwise, while gates 245–247 are enabled where the CARRY signal is false and the CW signal is true, corresponding to actual clockwise rotation of the turret.) The total number accumulated in the accumulator 265 represents the number of indexing pulses required to move from the present station No. 1 to the new station No. 23 with the turret moving in the counterclockwise direction as viewed in FIG. 7B. (The marker 440 in FIG. 7B diagrammatically indicates the operative position of turret 20. Thus the turret is shown with turret position No. 1 operative in FIG. 7B.)

In the case of a readout operation for counterclockwise indexing movement, the true potential level appearing at output 76, FIG. 4A, of the CCW Register 70 (when CCW=0) is supplied to NAND gate 441 appearing at the left in FIG. 5D, the gate 441 then producing a positive going pulse at output 360, FIG. 5D, to signify the end of the counterclockwise indexing readout operation.

With the completion of the readout operation, conductor 352, FIG. 5D, will be at ground potential. Conductor 141 (CW OR CCW) will be at ground potential as represented at 443, FIG. 2F. The notation (2F) following the reference numeral 141 in FIG. 5D indicates that the potential as a function of time of conductor 141 is shown in FIG. 2F.

Having described the circuitry for transferring of the successive counts from the storage register 90 to the accumulator 265, the circuitry for indexing the turret in accordance with the accumulated count in the accumulator will now be described.

As previously mentioned, the circuitry of FIG. 5D serves to reset the flip-flop formed by gates 140 and 314 after the appropriate total count has been entered into the accumulator. This is represented at 443 in FIG. 2F which represents the wave form at output conductor 141, FIG. 5D. The pulse appearing at conductor 360, FIG. 5D, at this time appears at the input to gate 450, FIG. 5A. If conductor 412, FIG. 5A, is at a true potential, signifying that the count in the accumulator is equal to or greater than 2000, gate 452 will be actuated to supply an enabling potential at the output of inverter 453. Under these conditions, the pulse at conductor 360, FIG. 5A, supplies a low going potential to gate 455, producing a true potential at conductor 456 and a ground potential at conductor 457 at the output of gate 459.

Referring to FIG. 5F, each of the inputs to gate 460 will be true, providing a ground potential at 461, and turning off transistor 462. Thus, with the count in the accumulator initially exceeding a count of 2000, output 463 (T CONV INPUT) in FIG. 5F will be at a true potential level.

Referring to FIG. 5I, under the same circumstances, input conductor 417 at the input to gate 464 will be at ground potential, so that the circuit of FIG. 5I will be inactive. On the other hand, if the initial count in the accumulator were less than 2000, gate 452, FIG. 5A and gate 460, FIG. 5F, would be disabled, while gate 464 would supply a ground potential at its output 465 and a high potential at the output of inverter 466 to enable gate 467 at the time of the pulse at conductor 360 which forms the second input to gate 467. In this latter event, the output of gate 469 would be high and the output of gate 470 would be at ground potential providing a true potential at output conductor 471 and a ground potential at conductor 472, FIG. 5I.

Referring to FIG. 6, an oscillator is indicated at 480 which is controlled by means of a circuit 481. Prior to a turret indexing operation, conductor 457 of circuit 481 will be at a true potential maintaining transistor 482 in the conducting condition, while input 463 to circuit 481 will be at ground potential maintaining transistor 483 in a non-conducting condition. With transistor 482 on, transistor 484 will also be on, and capacitor 485 will be charged to a maximum potential condition. Similarly, transistor 487 will be highly forward biased, producing a relatively high positive potential at circuit point 488 of the oscillator 480. The result will be that the oscillator 480 operates at a relatively low or minimum frequency which is supplied to output conductor 490 at the upper right in FIG. 6. The output pulses at conductor 490, FIG. 6, are supplied to a gate 492 at the left in FIG. 7B. Prior to the start of a turret indexing movement, however, conductor 456 will be at ground potential level, disabling gate 492.

Below gate 492 in FIG. 7B is a gate 500 having an input 501 labeled T 1KC OUTPUT which supplies 1 kilocycle per second pulses from a 1 kilocycle per second oscillator (not shown). Prior to the initiation of actual turret indexing movement, conductor 471 will be at ground potential so as to disable gate 500. If the initial count in the accumulator is less than 1000, conductor 471, FIG. 5I, will become true in response to the START DRIVE$_p$ pulse at conductor 360. Thus in this event, one kilocycle per second pulses would be transmitted to the input of inverter 504, FIG. 7B, supplying positive going pulses to the input of gate 505. If the turret is ready for indexing movement, conductors 506 and 507 will both be at a true potential, and a low going pulse will be produced at output 508 of gate 505. The result will be positive going 1 kilohertz pulses at output 510 of gate 511. These pulses are transmitted to one input of gates 513 and 514, one of which is enabled according to the condition of conductors 87 and 88. For a clockwise indexing movement, conductor 87 will be at true potential and low going pulses will appear at conductor 516 at the output of gate 513. If the conditions for the circuitry 518 provide a true potential at conductor 519, gate 520 will be enabled to produce high going pulses at conductor 522 and low going pulses at conductor 523 at the output of gate 524. The 1 kilohertz pulses will actuate the turret drive 21 to move the turret 20 in the clockwise direction at a relatively low rate of speed. At the same time, one kilohertz pulses are supplied from conductor 510 to conductor 525 (T CLOCK). Conductor 525 connects with the input of inverter 526 at the right in FIG. 5C, producing high going pulses at output conductor 291 of gate 290. The result is that the accumulator 265, FIG. 4G, is counted down in step with the pulses supplied to the turret drive 21. When the accumulator reaches a count of zero under these conditions, the low going signal at conductor 394 at the output of NAND circuit 393, FIG. 4G, is supplied to the input to gate 531 at the left center of FIG. 4A, so as to transmit a high going pulse to the input of inverter 532 and a low going pulse at the input of gate 533. This in turn produces a low going pulse at the output of inverter 535 for resetting position register 60 to a count of zero. Also the high going pulse at the output of gate 533 produces a low going pulse at the output of inverter 537, a high going pulse at the output of gate 538 and a low going pulse at the output of gate 540 at conductor 51. The trailing positive going edge of the pulse at conductor 541 serves to activate gates 551–556 so as to transfer the position number registered in the command register 30 to the position register 60. Thus, for example, if the command were to move from a present position of 01 to a new position of 08, the command register 30 would contain the position number 08, and this position number would be transferred to the position register 60 when the count in the accumulator reached zero indicating that the commanded move had been completed.

The high going trailing edge of the pulse at conductor 541 produces a low going pulse at the output of inverter 560 which is transmitted by means of output conductor 561 to the input of gate 562 at the left in FIG. 5B. This produces a high going input to inverter 563 and a low going output from the inverter which resets the bistable composed of gates 565 and 566, and produces a high going output at the output of gate 568 and a low going output from inverter 569 at output conductor 570. Resetting of the bistable 565–566 produces a low going pulse at the output of gate 571 so as to reset the bistable including gate 573 and gate 101.

The low going output at conductor 570 labeled $\overline{\text{T VCO RESET}}$ is transmitted to an input of gate 470, FIG. 5I, to reset the bistable formed by gates 469–470, to provide a ground potential at conductor 471. A ground potential at conductor 471 disables gate 500, FIG. 7B, to discontinue the indexing movement of the turret 20. The indexing movement produced by a driving pulse rate of 1 kilohertz is such that the turret is accurately stopped under these conditions.

Where the initial count in the accumulator was greater than 2000, it will be recalled that gate 452, FIG. 5A, enabled gate 450 so as to provide a true potential at conductor 456. This in turn would produce a ground potential at conductor 457, FIG. 5A, so as to turn off transistor 482, FIG. 6. This action discontinues the charging of capacitor 485. Referring to FIG. 5F, it will be recalled that with conductor 456 at a true potential level, and the count in the accumulator greater than 2000, transistor 462 would be off to place a true potential at conductor 463. Referring to FIG. 6, a true potential at conductor 463 would turn on transistor 483, allowing the gradual discharge of capacitor 485 through resistor 590 and the collector-emitter circuit of transistor 483. The time constant on this circuit may be approximately 180 milliseconds, and the result of the gradual discharge of capacitor 485 is the progressive increase in the frequency from oscillator 480 as represented at 591, FIG. 3. Thus, the oscillator 480 progressively builds up to a maximum frequency as determined by the adjustment of variable resistor 593, the maximum frequency being about 4 kilohertz. The 4 kilohertz signal is transmitted to the T CLOCK conductor 525, FIG. 7B so as to cause the accumulator to be counted down, and the same frequency of pulses is supplied to the turret drive 21 to drive the turret at a maximum rate. The operation of the oscillator at its maximum frequency is represented by portion 595 of the curve of FIG. 3. When the count in the accumulator is reduced to a value below 1000, conductor 407, FIG. 5F goes to ground potential turning on transistor 462 and providing a ground potential signal at output 463, FIG. 5F. Referring to FIG. 6, a ground potential at conductor 463 turns off transistor 483 and allows capacitor 485 to be charged through resistors 601 and 590. The time constant for this recharging of capacitor 485 may be 275 milliseconds, for example, and the consequent progressive reduction in the operating frequency of oscillator 480 is indicated at 602 in FIG. 3. When the capacitor 485 is fully charged, the oscillator 490 may be operating at a frequency of about 900 hertz, for example, as indicated at point 603 in FIG. 3. Operation continues at this relatively low frequency until the count in the accumulator reaches zero. It will be recalled that when the accumulator reaches a count of zero, a negative going pulse appears at the output of inverter 569, FIG. 5B, this signal being labled $\overline{\text{T VCO RESET}}$. This signal is supplied to an input of gate 459, FIG. 5A, to reset the bistable circuit formed by gates 455 and 459, and to disable gate 492, at the left of FIG. 7B.

From the foregoing description, the detailed logic for controlling the indexing movement of the turret 20 in response to a command supplied to a register 30, FIG. 4A, will be understood. The circuitry for automatically indexing the turret to its initial position (01) may now be referred to, so as to complete the description of the detailed circuitry.

When the turret is commanded to go to the T01 station from the punched tape input, or (in manual mode) from a switch input on the front of the control panel, T01 is inserted in the command register 30. The following sequence then takes place. First the shot pins are driven out. When the shot pins are out, 1 kilohertz pulses are gated by means of gate 611, FIG. 7B. The low going pulses to inverter 612 produce high going pulses at the input to gate 613, low going pulses at conductor 519, high going pulses at conductor 522, and low going pulses at conductor 523, producing clockwise indexing movement of turret 20. When the turret gets closed to the T01 position, a turret slowdown cam is made, and conductor 615 goes to ground potential, while conductor 616 goes to a true potential level. At this time, an oscillator (not shown) produces pulses at a rate of 80 pulses per second at conductor 620', FIG. 7B, and these low rate pulses are transmitted to the turret drive 21 moving the turret at a relatively low rate of speed. This lower value of speed ensures that the electrical drive and the hydraulic drive of component 21 are in step with each other. Next a turret zero cam is made. The control will continue to drive the turret until a preselected phase sequence is achieved. At that time the T ZEROED signal becomes true at the input to gate 620, FIG. 7A, and conductors 621 and 622 at the inputs to gates 611 and 623 go to a ground potential, discontinuing the supply pulses to the turret drive 21.

To explain the manner in which the command register is set to the value T01, reference is made to FIG. 5E, wherein a conductor 630 is shown labled $\overline{\text{RESET}}$ $\overline{\text{T ZEROED}}$. This conductor goes to ground potential in response to the turret zero signal, producing a positive going pulse at conductor 384, and a low going pulse at output conductor 388 so as to reset the command register 30 to a count of zero. Referring to FIG. 4A, the low going signal at conductor 630 is transmitted with suitable time delays via gates 631 and 632 and inverter 633, so as to provide a low going pulse at conductor 31 for the purpose of setting the command register to the value 01.

It will be observed that the command register 30 has an input 640 labled INCREASE $CR_p$, so that the count in the command register may be increased in a manual or step mode under the control of gates 641 and 642, FIG. 7A, inverter 643, and inverters 644 and 645.

Referring to FIG. 5G, it will be observed that because of gates 651 and 652 and inverters 653–655, there will be a ground potential at conductor 656 if command register 30 contains a count of zero. Similarly because of gate 658, conductor 656 will be at ground potential if a count of 30 is present in the command register.

Gate 659 responds to a count of 28, and gate 660 responds to a count of 27 to provide a ground potential at conductor 656. Thus referring to the gate 662 of FIG. 7A, conductor 656 will be at ground potential disabling the gate whenever the command register 30 contains an improper count value therein. Similarly, because of input conductor 63 to gate 662, if the control receives a new command equal to the present position of the turret, gate 662 will be disabled, preventing an enabling potential at its output 665. Thus an indexing cycle is blocked, and conductor 666 at the output of gate 566, FIG. 5B, cannot be set to a true potential.

It will be understood that there are a few input conductors to the illustrated circuit which originate in the manual controls or in the other circuitry of an overall numerical control system, these input conductors and their associated circuitry forming no part of the present invention. Further, it will be apparent that these input conductors can be controlled manually to operate the circuitry of the illustrated embodiment, as an alternative disclosure herein. The detailed circuitry is given merely by way of a specific example of implementation of the concepts of the present invention, and is not presented by way of limitation.

In the various figures, resistors and capacitors have been given specific quantitative values in accordance with a commerical embodiment, but these values are given merely by way of example. The abbreviation $\mu f$ stands for microfarad, the symbol pf stands for picofarad ($10^{-12}$ farad), the symbol K applied to resistors refers to kilohms, and the symbol $\Omega$ stands for ohms. The symbol $+5^v$ indicates a nominal applied potential of plus five volts, while the symbol $-5^v$ indicates an applied potential of minus five volts.

Referring to FIG. 2, FIG. 2A illustrates the wave form at conductor 671 at the input to gate 672, FIG. 7A. FIG. 2B indicates the potential at conductor 666 at the output of gate 566, FIG. 5B, and at the input to gate 357, FIG. 5D. FIG. 2C illustrates the wave form at conductor 49, FIG. 5B at the output of bistable 573, 101.

FIG. 2D illustrates the output at conductor 45, FIG. 5B, at the output of gate 299, which is connected to the input of the position register 60, FIG. 4A.

FIG. 2E illustrates the output at conductor 168 at the lower right of FIG. 5B. FIG. 2F illustrates the output at 141, FIG. 5D, at the output of bistable 140, 314. FIG. 2G indicates the output at conductor 135, FIG. 5C at the output of bistable 134, 286.

FIG. 2H indicates the output at conductor 456, FIG. 5A, from bistable 455, 459. FIG. 2I may be taken as representing the output pulses at conductor 525, FIG. 7B which are supplied to the turret drive 21.

Summary of Operation for FIGS. 2–7

FIG. 2 is a timing diagram for illustrating the sequence of operation of the illustrated embodiment. The times shown in the chart are variable and are not to any kind of scale. Assuming that the turret 20 is in position No. 1 as illustrated in FIG. 7B, the position register 60, FIG. 4A will show a position count of 01. If now the tape reader supplies a command T06, a T flip-flop (not shown) is set in response to the reading of the T character providing a true potential at conductor 671, FIG. 7A as illustrated at 381, FIG. 2. If all of the initial conditions are correct, and if the numerical values signifying the new station conform with the requirements of FIG. 5G, a ground level signal will appear at conductor 665, FIG. 7A, which will serve to set the bistable circuit formed by NAND gates 565, 566, FIG. 5B, providing a true potential at output 666 as indicated at 701, FIG. 2.

The ground level signal at conductor 665, FIG. 5B, also serves to set the bistable circuit formed by gates 101 and 573, FIG. 5B providing an enabling potential at conductor 49 as indicated at 702, FIG. 2. Gate 50, FIG. 5B, then transmits 150 kilohertz pulses to conductor 45 as indicated at 703, FIG. 2D. For the example given of a new command to T06, there would be five pulses at 703, FIG. 2B which are transmitted to the position register 60, the CCW Register 70 and the CW Register 71. When the count in the position register was six (PR=06), comparator 61 would provide output signals at 48 and 63, and the signal at 48, FIG. 5B, would serve to disable gate 50. The signal at conductor 63, FIG. 5B, would serve to reset the bistable circuit 101, 573, providing a ground level output at conductor 49 as indicated at 704, FIG. 2.

The resetting of the bistable circuit 101, 573, FIG. 5B transmits a low going pulse to conductor 103, FIG. 5B, which results in a positive going pulse at conductor 168, FIG. 5B, as indicated at 706, FIG. 2E. The resetting of the bistable circuit 101, 573, FIG. 5B, also produces a pulse at 120 at the right in FIG. 5B, and the trailing low going edge of this pulse serves to set the bistable circuit 140, 314, FIG. 5D, and provide a true potential at output 141 and as indicated at 707 in FIG. 2F. The same signal is applied to gate 130 at the upper left in FIG. 5C, setting the bistable circuit 134, 286 and providing a true potential at output 135 as indicated at 708, FIG. 2G.

The converter circuit 170, FIG. 4B, senses the count in the lower order stages of position register 60, while the circuit of FIG. 4D senses the condition of the higher order stages representing weights of 10 and 20, respectively. Since output conductor 710, FIG. 4B is true for PR=06, the gate 220, FIG. 4E is enabled to transmit the pulse at conductor 168 which is represented at 706, FIG. 2, so that a pulse appears at conductor 223, FIG. 4F. The signal produced by the circuits of FIG. 4B and 4D may be termed a digital station number signal in accordance with the count value in the position register 60. By supplying this station number signal to the readout circuitry of FIGS. 4C and 4E, a distance selection signal is generated either at conductor 223, FIG. 4E, conductor 187, FIG. 4C, or 210, FIG. 4E, with the respective distance selection signals being generated in response to station number signals representing stations of the turret 20, FIG. 7B, having the same spacing from respective adjacent stations. In the illustrated embodiment, the station number signals include a signal in accordance with the condition of the flip-flop circuit 430, 431 at the lower part of FIG. 4A which signals whether the indexing movement of the turret is to be in a clockwise direction as indicated by arrow 22, FIG. 7B, or in the direction of arrow 23, FIG. 7B. (In the embodiment of serial 77,139 incorporated herein by reference, the distance selection signals take into account the direction of indexing movement, and the station number signals are the same for either direction of indexing movement.)

Referring to FIG. 7B, the spacing between station No. 6 and station No. 5 corresponds to 375 indexing pulses, as does the spacing between station No. 6 and station No. 7, so that the station number signal need not discriminate as to the direction of indexing movement. The distance selection signal at 223, FIG. 4F, causes the number 375 in binary form to be loaded into the storage register 90 because of the operation of the read only memory diagrammatically indicated at 230.

With the number 375 loaded into the storage register 90, circuit 266 supplies a true potential at 267 so as to enable a gate 282, FIG. 5C. Gate 281, FIG. 5C is also enabled at this time as indicated at 708, FIG. 2G. Thus the 150 kilohertz pulses at the input to gate 281 are transmitted by gate 282 to conductor 262, FIG. 5C, the pulses also being transmitted to gate 290, FIG. 5C whose output conductor 291 connects with the input of accumulator 265, FIG. 4G. The result is that the storage register 90 counts down from 375 to zero, while the accumulator 265 counts up from zero to 375 ( in binary coded decimal notation ).

When the storage register 90 is counted down to a count of zero, output conductor 267 returns to ground potential resetting the bistable circuit 134, 286, FIG. 5C, as indicated at 712, FIG. 2. Thus, the memory circuit 230, FIG. 4F, has supplied an indexing distance number (375) to the accumulator 265 in accordance with the spacing from station No. 5 to station No. 6 of the turret 20.

At this time it is necessary to supply a pulse to the position register 60 so as to change the count therein and thus to provide a station number signal representing a further station to be traversed during the indexing of the turret. Where, as in the present example, the turret is to be indexed from station No. 1 to station No. 6, the first station number signal utilized is that corresponding to station No. 6, with the readout circuit of FIG. 4 supplying an indexing distance number in accordance with the spacing from station No. 5 to station No. 6. Thus, the next step is to reduce the count in the position register 60 to 05, and readout an indexing distance number according to the spacing between station No. 4 and station No. 5. Thus, in the illustrated embodiment, the successive indexing distance numbers are read for a sequence of stations (No. 6, No. 5, No. 4, etc. for example) which is opposite to the actual sequence of stations to be traversed (from station No. 1 to station No. 2 to station No. 3, to station No. 4, etc.). (In the embodiment of Ser. No. 77,139 the position register is stepped at the same time that the turret is moved from one station to the next, so that the readout of indexing distance numbers is for a sequence of stations which is the same as the sequence of stations traversed by the indexing movement of the turret.)

In the illustrated circuit, the counting of the position register in the down direction at this time is controlled by the circuit illustrated in FIG. 5H. When the bistable circuit 134, 286, FIG. 5C is reset as indicated at 712, FIG. 2G, the low going signal at output 292 is transmitted to gate 293 at the lower left in FIG. 5B, producing a low going pulse at output 298 which is supplied to the input of gates 299 and 300, FIG. 5B. The result is that the position register 60 is counted down and the value registered in registers 70 and 71 is correspondingly changed, the CW Register 71 which controls the clockwise indexing case, now registering the value of 04, indicating that four further readout cycles are required for the example referred to where the turret is to be indexed from position 01 to position 06. The actuating pulse for the position register is indicated at 301, FIG.

2, while the further readout pulse for the readout circuit of FIG. 4 is indicated at 714, FIG. 2E.

The readout operation continues as indicated in FIG. 2 until the position register shows a count of 02 and the CW Register shows a value 01. Under these conditions, gate 202, FIG. 4E, is active to produce a pulse at output 210. In this case, the digital station number signal includes a signal at the upper two inputs to gate 202, signifying that the position register is at position 02, and a signal at the lower input 216 indicating that the turret indexing movement is to be in the clockwise direction. Thus, referring to station No. 2 in FIG. 7B, it will be observed that the spacing between station No. 2 and station No. 1 is twice as large as the spacing from station No. 2 to station No. 3, requiring a readout of 750 indexing pulses from memory 230, FIG. 2F, for the case where the indexing distance numbers are being read in a reverse sequence in comparison to the direction in which the stations will actually be indexed.

After transfer of the value 750 to storage register 90, the storage register is counted down to zero, and a corresponding number of pulses are added to the accumulator 265, so that the accumulator 265 now contains a total count corresponding to the number of indexing pulses between the successive stations No. 6 and No. 5, No. 5 and No. 4, No. 4 and No. 3, No. 3 and No. 2, and No. 2 and No. 1. The total number of indexing pulses in the accumulator is thus that number required to index the turret 20 from the present position shown in FIG. 7B (PR=01) to the commanded position PR=06. The readout operation is terminated when the CW Register 71 shows a value of zero, this condition being present at conductor 79 at the input to gate 351, FIG. 5D, and serving to reset the bistable 140,314 as indicated at 443 in FIG. 2F. (FIG. 2G indicates readout cycles at 708, 721, 722, and 723, and a total of four readout cycles would be required in indexing from turret station No. 1 to turret station No. 5, or from turret station No. 1 to turret station No. 23, for the case of counterclockwise indexing.)

For the case of counterclockwise indexing, if the position register initially shows a position PR=01, and the command register receives a command T23, 22 PR CLOCK PULSES 703 would be supplied to the position register 60 so as to count the position register from the value 01 to the value 23. In this case, however, the capacity of the CW Register 71 (which is 13) would be exceeded, causing the setting of the bistable circuit 430,431, at the lower part of FIG. 4A. The result is a true potential level at the CARRY output 88 of gate 433, and this signal is utilized in the readout circuitry of FIGS. 4C and 4E in determining the station number signals and the the distance selection signals resulting therefrom which are supplied to the memory 230, FIG. 4F. Also the circuit of FIG. 5H responds to the ground potential at conductor 87 under these conditions to cause the position register to be progressively stepped in the up direction. The CCW Register 70 under these conditions contains an initial value of 04 and controls the number of readout cycles such as indicated at 708, 721-723, FIG. 2G.

Thus, for counterclockwise indexing, the position register is initially at a count of 23 and is stepped progressively to counts of 24, 25, and 26, so as to control the readout of indexing distance numbers corresponding to the spacing between station No. 23 and No. 24, No. 24 and No. 25, No. 25 and No. 26, and No. 26 and No. 1. When the total indexing distance has been placed in the accumulator 265, the turret 20 is ready for indexing movement in the counterclockwise direction as indicated by arrow 23, FIG.7B, the successive stations No. 1, No. 26, No. 25, No. 24 and No. 23 being registered with the operating position indicated at 440, FIG. 7B, during the actual indexing movement of the turret.

At the completion of the readout operation, for the case of counterclockwise indexing, the CCW Register 70 will reach a value of zero to transmit a true potential signal at output 76, FIG. 4A, which is transmitted at this time by means of gate 441, FIG. 5D to reset the bistable circuit 314, 140 as indicated at 443, FIG. 2F.

In the case of either clockwise or counterclockwise indexing, at the completion of the readout operation, a pulse appears at output conductor 360, FIG. 5D which serves to initiate the transmission of pulses to the turret drive 21, FIG. 7B, corresponding pulses being supplied to accumulator 265 until such time as the accumulator is counted down to a count of zero.

If the initial total count in the accumulator is 2000 or more, indicating a relatively long indexing movement of the turret, a bistable circuit 455, 459, FIG. 5A, is set as indicated at 725, FIG. 2H enabling the variable frequency oscillator circuit of FIG. 6. The circuitry is such that the oscillator 480, FIG. 6, starts at a relatively low frequency and progressively increases in frequency as indicated at 591, FIG. 3, until a maximum frequency is reached as indicated at 595, FIG. 3. When the accumulator has a count of less than 1000, the circuit of FIG. 5F senses this condition, and the oscillator frequency is progressively reduced as indicated at 602, FIG. 3. Indexing movement is terminated when the count in the accumulator reaches zero. Where the initial total count in the accumulator is less than 2000, the circuit of FIG. 5I controls to provide an initial pulse rate of 1 kilohertz to the turret drive 21, the 1 kilohertz pulses being discontinued when accumulator reaches a count of zero. The pulses supplied to the motor of drive component 21, FIG. 7B are indicated at 726, FIG. 2I, these same pulses being supplied to the accumulator as indicated by conductor 525, FIG. 7B being connected to the inverter 526, at the right in FIG. 5C.

Explanation Of FIG. 8 Showing Certain Principal Interconnections Between The Circuits Of FIGS. 4–7

In order to provide a single view illustrating the significant information flow between the circuits of the detailed drawings, FIG. 8 is presented wherein blocks 801–803 represent the complete circuits of the respective figures indicated in parentheses within the respective blocks. Referring to the upper left of FIG. 8, conductor 814 from circuitry 807 to circuit 801 represents the 12 input conductors shown in FIG. 5G, these conductors being shown and labeled below command register 30 in FIG. 4A. As explained in the foregoing summary of operation if all initial conditions are correct, and if the numerical value signifying the new station as found in command register 30 conforms with the requirements of circuit 801, a ground level signal will appear at conductor 665 at the output of circuit 802. The ground level signal at conductor 665 enables the circuit of component 805 so as to transmit 150 kilohertz pulses supplied by component 803 to conductor 45 at the output of component 805. When comparator 61 of component 807 shows that the position register 60 of component 807 has reached a count corresponding to that introduced into the command register 30 of component 807, the count in the position register is transmitted to component 808 from component 807. Line 815 in FIG. 8 represents the 4 input conductors to FIG. 4B and line 816 represents the two input conductors 175 and 176 in FIG. 4D. It will be observed that there are multiple interconnections between the output conductors of FIGS. 4B and 4D with the input conductors of FIGS. 4C and 4E, so that it is appropriate that component 808 represent the circuitry of FIGS. 4B through 4E.

The principal outputs from component 808 are conductor 223 (FIG. 4E), conductor 187 (FIG. 4C) and conductor 210 (FIG. 4E), these conductors forming inputs to the read only memory 230 of FIG. 4F which as a whole is represented by component 811 in FIG. 8.

Information flow is from component 811 to component 812, the count found in the storage register of component 811 being counted down to zero as pulses are simultaneously supplied to the accumulator 265 of component 812, the fact of this information flow being represented by the dashed flow line 817 between components 811 and 812.

After each transfer of a count value from component 811 to component 812, circuit 806 is effective to control the operation of circuitry 807 by means of conductors 150, 151, 155 and 156 so that the position register is incremented in a desired direction, the successive count values assumed by the position register controlling components 808 and 811 so that the desired count values are read from the memory of component 811 and transferred to the accumulator of component 812.

When a count value has been transferred to the accumulator of component 812 in accordance with the total distance of the desired indexing movement in the desired direction, this will be signaled by a change in potential condition at conductor 76 or 79 leading from component 807 to component 810, producing a pulse at conductor 360 at the output of component 810 which will serve to initiate the indexing operation. As has been explained in detail, the rate or schedule of indexing operation is controlled in accordance with the count in the accumulator of component 812 as reflected by the condition of output conductors 407, 412 and 417 which extend between components 812 and 813, As represented by conductor 525 extending between components 813 and 809, the pulse rate controlling the indexing movement is supplied via circuit 809 and conductor 291 to cause countdown of the accumulator of component 812. When the accumulator reaches a zero count, a signal appears for example at conductor 394 from component 812 which results in stopping of the indexing movement, and resetting of the various components in preparation for a further command to be supplied to the command register of component 807.

With respect to component 813, it will be observed that conductors 407, 412 and 417 from component 812 connect respectively with inputs to FIGS. 5F, 5A and 5I, justifying the inclusion of these figures as part of component 813. It will also be observed that output conductors 457 of FIG. 5A and 463 of FIG. 5F form inputs to the variable frequency oscillator of FIG. 6, the output of FIG. 6 via conductor 490 leading to the turret drive of FIG. 7B. Similarly output 456 of FIG. 5A and output 471 of FIG. 5I lead to inputs of the turret drive of FIG. 7B, so that it is appropriate to include each of these circuits as part of component 813.

Modifications

It may noted that as in the embodiment of serial 77,139, the position register 60 may control the readout operation while counting in the same direction as the turret is to be indexed. For example, comparator 61 could include comparison logic to determine the desired direction of indexing movement by directly comparing the number in the position register 60 with the new commanded position in register 30. The comparator 61 would then control the direction of stepping of position register 60 in accordance with the direction in which the turret 20 was to be indexed. In this case, the readout circuity of the third figure of serial 77,139 would be applicable.

As a different modification, the position register 60 could control the readout circuitry as the register 60 was initially stepped up to a value equal to the value in the command register. If the total count in accumulator 265 now exceeded a count corresponding to 180° of indexing, a comparison circuit such as that indicated in FIG. 4G could sense this condition as requiring counterclockwise indexing movement of the turret. If the accumulator 265 had a total count capacity equal to 360° of indexing movement, the accumulator 265 could be counted in the up direction to generate a number of pulses required to index the turret in the counterclockwise direction.

It will be apparent that many other modifications and variations may be affected without departing from the scope of the novel concepts of the present invention.

I claim:

1. The method of controlling indexing of a load between successive stations some of which have different spacing therebetween, the stations being assigned sequential station numbers, said method comprising providing a plural stage position counter operable to register sequential plural order count values each corresponding to one of said sequential station numbers in response to respective signal pulses supplied thereto, and establishing in said position counter a plural order count value corresponding to one of a present station number corresponding to a present station at which the load is presently positioned and a commanded new station number corresponding to a new station to which the load is to be indexed, supplying successive single pulses to the position counter to step the position counter to successive count values corresponding to the station numbers between said present station number and said new station number, deriving plural order coded digital station number signals from said plural stage position counter as each sequential plural order count value is registered therein and supplying said plural order coded digital station number signals from said plural stage position counter in accordance with the successive corresponding count values registered therein to a memory readout circuit for generating in response thereto a number of different distance selection signals not less than the number of different spacings between successive stations, with each distance selection signal being generated only in response to station number signals representing stations having the same spacing from respective adjacent stations, and supplying the respective distance selection signals so generated to respective inputs of a memory circuit to read from said memory circuit respective indexing distance numbers all substantially exceeding the highest station number assigned to said stations and proportional to the respective spacings between the stations corresponding to the supplied station number signals and said respective adjacent stations, the sum of said indexing distance numbers so read from said memory circuit being proportional to an indexing distance from the present station to the new station, and being utilized to control the indexing movement of the load to the new station.

2. The method of claim 1 wherein the successive stations are arranged in a closed loop path, with the supply of pulses to the position counter stepping the position counter in one counting direction between successive count values for indexing of the load in one direction and stepping the position counter to successive count values in an opposite counting direction for indexing of the load in an opposite indexing direction.

3. The method of claim 2 wherein a register is provided having a capacity proportional to substantially one half the indexing distance about said closed loop path, said method further comprising supplying a number of pulses to said register generally proportional to the distance from the present station to the new station in a given indexing direction, and controlling actual indexing movement in the opposite direction if the capacity of said register is exceeded.

4. The method of claim 3 wherein the direction of stepping of the position counter is controlled in accordance with whether the capacity of the register is or is not exceeded.

* * * * *